(12) United States Patent
Nygren et al.

(10) Patent No.: US 11,174,621 B2
(45) Date of Patent: Nov. 16, 2021

(54) IMPLEMENT AND A METHOD FOR OBTAINING INFORMATION RELATED TO SAID IMPLEMENT

(71) Applicant: ÅLÖ AB, Umeå (SE)

(72) Inventors: Tomas Nygren, Umeå (SE); Gustaf Lagunoff, Umeå (SE)

(73) Assignee: ÅLÖ AB, Umeå (SE)

( * ) Notice: Subject to any disclaimer, the term of this patent is extended or adjusted under 35 U.S.C. 154(b) by 230 days.

(21) Appl. No.: 16/379,600

(22) Filed: Apr. 9, 2019

(65) Prior Publication Data

US 2019/0234047 A1 Aug. 1, 2019

Related U.S. Application Data

(63) Continuation of application No. PCT/SE2017/050985, filed on Oct. 9, 2017.

(30) Foreign Application Priority Data

Oct. 10, 2016 (SE) .................................... 1651329-3

(51) Int. Cl.
*E02F 9/20* (2006.01)
*E02F 9/26* (2006.01)
(Continued)

(52) U.S. Cl.
CPC .......... *E02F 9/2004* (2013.01); *E02F 9/2289* (2013.01); *E02F 9/26* (2013.01); *E02F 9/264* (2013.01); *G01G 19/083* (2013.01)

(58) Field of Classification Search
CPC ..... E02F 9/2004; E02F 9/2228; E02F 9/2289; E02F 9/264; E02F 9/26; G01G 19/083
See application file for complete search history.

(56) References Cited

U.S. PATENT DOCUMENTS

| 7,194,855 B2 | 3/2007 | Pfaff |
| 2006/0070773 A1 | 4/2006 | Dahl et al. |

(Continued)

FOREIGN PATENT DOCUMENTS

| EP | 0247335 A2 | 12/1997 |
| EP | 0866177 A2 | 9/1998 |

(Continued)

OTHER PUBLICATIONS

International Search Report and Written Opinion for PCT/SE2017/050985, dated Dec. 15, 2017, 13 pages.

(Continued)

*Primary Examiner* — Abiy Teka
(74) *Attorney, Agent, or Firm* — Dinsmore & Shohl LLP

(57) ABSTRACT

The present disclosure relates to an implement connectable to a work vehicle. The implement comprises an arm, a fastening arrangement arranged at a first part of the arm, and an attaching arrangement. The fastening arrangement is connectable to the work vehicle. The attaching arrangement is connected to a second part of the arm. The implement further includes a first hydraulic circuit configured to carry hydraulic fluid to at least one first hydraulic function, at least one first sensor arranged to obtain sensor signals at least related to the at least one first function, a local control element, and a digital interface. The local control element is arranged to receive the obtained sensor signals, to calculate at least one state parameter related to the implement based on the obtained sensor signals, and to feed the calculated state parameter to the digital interface.

18 Claims, 9 Drawing Sheets

(51) Int. Cl.
*E02F 9/22* (2006.01)
*G01G 19/08* (2006.01)

(56) References Cited

U.S. PATENT DOCUMENTS

2009/0216412 A1   8/2009   Mindeman et al.
2014/0167971 A1   6/2014   Stanley et al.

FOREIGN PATENT DOCUMENTS

| | | |
|---|---|---|
| EP | 1640512 A2 | 3/2006 |
| EP | 1997966 A2 | 12/2008 |
| JP | H04_136327 A | 5/1992 |
| JP | H04136327 * | 5/1992 |
| WO | 2008140336 A1 | 11/2008 |
| WO | 2009025772 A1 | 2/2009 |
| WO | 2013020856 A2 | 2/2013 |
| WO | 2015179046 A1 | 11/2015 |

OTHER PUBLICATIONS

International-Type Search Report for Patent Application No. 1651329-3, dated Jun. 2, 2017, 5 pages.

* cited by examiner

IMPLEMENT AND A METHOD FOR OBTAINING INFORMATION RELATED TO SAID IMPLEMENT

RELATED APPLICATIONS

The present application is a continuation of PCT Application No. PCT/SE2017/050,985 filed Oct. 9, 2017, which claims priority to Swedish Application No. SE 1651329-3, filed Oct. 10, 2016, all of which are hereby incorporated in their entirety by reference as set forth herein.

TECHNICAL FIELD

The present disclosure relates to an implement connectable to a work vehicle, wherein said implement comprises an arm, a fastening arrangement arranged at a first part of the arm, said fastening arrangement being connectable to the work vehicle; an attaching arrangement connected to a second part of the arm, the attaching arrangement being attachable to a working tool; and a first hydraulic circuit configured to carry hydraulic fluid to at least one first hydraulic function.

The present disclosure further comprises a work vehicle arrangement comprising a work vehicle comprising a fastening arrangement connectable to the implement; and the implement.

The present disclosure further relates to a method for obtaining information related to an implement.

TECHNICAL BACKGROUND

Agricultural vehicles, such as tractors may be provided with a front loader. Operation of this front loader is controlled from the cabin of the tractor. For example an operator at the cabin of the tractor controls lifting and lowering of the loader and movement of a tool attached to the loader. The lifting and lowering of the loader may be performed by means of a first hydraulic circuit and movement of the attachment is characteristically performed by means of a hydraulic circuit controlled from the tractor.

EP 1640 512 relates to a loader control system for the control of a loader bucket. The loader control system comprises control means for actively adjusting the pressure in lift cylinders using the electrically actuated hydraulic valves, if said pressure varies outside a predetermined dead band.

WO 2013/020856 discloses an implement for attachment to a vehicle, wherein a first hydraulic circuit for control at the front loader is connectable to a control valve at the tractor. The control valve (and switch means) is controlled by a tractor control unit in the tractor to regulate fluid flow through the first hydraulic circuit.

SUMMARY

One object of the present disclosure is to obtain an improved implement connectable to a work vehicle.

In some embodiments, this has been achieved by means of an implement connectable to a work vehicle. The implement comprises an arm; a fastening arrangement arranged at a first part of the arm, said fastening arrangement being connectable to the work vehicle; an attaching arrangement connected to a second part of the arm, said attaching arrangement being attachable to a tool; a first hydraulic circuit configured to carry hydraulic fluid to at least one first hydraulic function; at least one first sensor arranged to obtain sensor signals at least related to the at least one first function, a local control element, and a digital interface. The local control element is arranged to receive the obtained sensor signals, to calculate a state parameter related to the implement based on the obtained sensor signals and to feed the calculated state parameter to the digital interface. The digital interface, in turn, is arranged to transmit the received state parameter to the work vehicle.

Thus, communication of data to and from the implement is performed digitally via the digital interface. This provides for a robust solution where no analogue signals have to be communicated between the implement and the work vehicle to which it is attached.

Further, the intelligence is related to the implement. The implement control element performs processing; it is no just a gatherer of data. As the intelligence for obtaining information related to obtained sensor signals is arranged at the implement, the implement hardware and software forms a separate module which can be equipped to the work vehicle when it is desired to have an implement attached to the work vehicle. A work vehicle without an implement does not need to be prepared with components for use when attaching an implement.

The implement can be used at any work vehicle. As is clear from the above, no preparations are required at the work vehicle for installing the implement.

Further, the data handled by the local control element can be stored at the local control element. Program code for executing the different tasks of the local control element may also be stored at the implement. Further, the local control element can store data related to characteristics of the implement to which it is mounted. The local control element comprises then one or a plurality of memories for storing at least some of the data above.

Accordingly, all information related to obtained sensor signals can be obtained, processed and stored at the implement. Further, characteristics of the implement can be stored at the implement for example for use in the processing. Thus, as all data related to the implement can be stored at the implement. This has the consequence that if an implement is moved for example from one work vehicle to another work vehicle, all data associated therewith follows the implement. This enables accurate monitoring of the operation of the implement.

Thus, implements can be used together with and switched between a plurality of work vehicles while keeping track of each individual implement. Each individual implement has the ability to know its own characteristics, parameters and settings. The work vehicle to which an individual implement is attached on the other hand, does not know that, at least not without providing a separate logistic solution for obtaining this information. In fact, the work vehicle has normally no way of knowing which implement is attached, and the work vehicle does certainly not know the characteristics, parameters and settings of the implement presently attached.

In different embodiments, the at least one first hydraulic function comprises a movement of a tool in relation to the implement and wherein the at least one first sensor comprises a sensor arranged to obtain signals relating to the rotational position of the tool in relation to the implement.

In accordance therewith, the state parameter may comprise a first state parameter related to the position of the tool, velocity of the tool, acceleration of the tool, or a combination thereof in related to the implement.

The local control element is in different embodiments arranged to calculate the first state parameter as a relative position of the tool in relation to the implement, and wherein the local control element is arranged to calculate the relative position based on the obtained sensor signal relating to the rotational position of the tool in relation to the implement and based on a maximum and a minimum rotational position of the tool in relation to the implement The at least one first sensor may comprise a sensor arranged to obtain signals relating to the rotational position of the tool in relation to the implement. The at least one first sensor may be arranged to sense a pivotal position of the tool in relation to the implement. The at least one first sensor may comprise a radial Hall sensor.

In other embodiments, the implement comprises a second hydraulic circuit configured to carry hydraulic fluid to at least one second hydraulic function and at least one second sensor arranged to obtain sensor signals at least related to the at least one second function.

In other embodiments, the at least one second hydraulic function comprises a movement of the implement in relation to the work vehicle and wherein the at least one second sensor comprises a sensor arranged to obtain signals relating to the rotational position of the implement in relation to the work vehicle.

The state parameter may then comprise a second parameter related to the position of the implement, velocity of the implement, acceleration of the implement, or a combination thereof, in relation to the work vehicle.

In other embodiments, the second state parameter comprises a relative position of the implement in relation to the work vehicle. The local control element is arranged to calculate said relative position based on the obtained signal relating to the rotational position of the implement in relation to the work vehicle and based on a maximum and minimum rotational position of the implement in relation to the work vehicle.

The at least one second sensor may comprise a sensor arranged to obtain signals relating to the rotational position of the implement in relation to the work vehicle. The at least one second sensor may be arranged to sense a pivotal position of the implement in relation to the work vehicle. The at least one second sensor may comprise a radial Hall sensor.

In other embodiments, the state parameter comprises a third parameter related to the position of the working tool, velocity of the working tool, acceleration of the working tool, or a combination thereof, in relation to the work vehicle. The local control element may then be arranged to calculate the position of the working tool, velocity of the working tool, acceleration of the working tool, or a combination thereof in relation to the work vehicle based on the obtained signals from the first and second sensors.

In other embodiments the first sensor, the second sensor, or both comprise at least one pressure sensor arranged to obtain a signal related to a hydraulic pressure related to the implement. The local control element is then arranged to calculate a fourth state parameter related to the hydraulic pressure, a pressure change, pressure acceleration, or a combination thereof.

The local control element may be arranged to calculate the fourth state parameter as a relative hydraulic pressure based on the obtained signal related to the hydraulic pressure and based on a maximum hydraulic pressure.

The implement may comprise a first hydraulic cylinder arrangement connected to a first hydraulic connection for control of the at least one first hydraulic function. Instead or in addition thereto, a second hydraulic cylinder arrangement is connected to a second hydraulic connection for control of the at least one second hydraulic function. The least one pressure sensor may then be arranged to obtain a signal related to at least one pressure related to the first cylinder arrangement, the second cylinder arrangement, or both.

In other embodiments the at least one state parameter comprises a fifth state parameter relating to a weight of a load carried by a working tool mounted to the implement. The local control element is arranged to calculate the load weight based on a known, i.e. measured relation, calculated relation, or both, between the load weight and the hydraulic pressure and based on the signal obtained by the pressure sensor. The known relation may be determined based on geometrical calculations, a calibration process, or both.

The local control element is in different arranged to record an obtained hydraulic pressure related to the second cylinder arrangement during lift of the load, wherein the local control element is arranged to determine the load weight based on the recorded pressure.

In some embodiments, the at least one first sensor is arranged to obtain signals relating to the rotational position of the implement in relation to the work vehicle. The at least one second sensor comprises then a sensor arranged to obtain signals relating to the rotational position of the tool in relation to the implement. The pressure sensor is arranged to obtain signals relating to the hydraulic pressure. The local control element is arranged to calculate the fifth state parameter related to the weight of the load carried by the working tool based on said obtained sensor signals.

The local control element may be arranged to determine whether the calculated at least one state parameter fulfils at least one pre-set requirement and when the at least one pre-set requirement is not fulfilled, obtain an implement status report informing that the calculation of the state parameter does not fulfil the pre-set requirement and to feed the obtained implement status report to the digital interface.

Thereby, the operator can be confident that the state parameters delivered are reliable. It can even be determined an uncertainty related to the state parameters. Thus, it can even be established that the state parameters are within pre-set boundaries.

The implement status report comprises information related to which pre-set requirement is not fulfilled.

The local control element may be arranged to refrain from feeding the calculated at least one state parameter to the digital interface when the at least one pre-set requirement is not fulfilled.

In other embodiments, the local control element is arranged to receive work vehicle related signals or messages for example via the digital interface.

The digital interface may comprise a contactless probe for connection to a digital data bus of the work vehicle. The contactless probe is arranged to monitor the traffic on the digital data bus and to recover said work vehicle related signals or messages.

In other embodiments the work vehicle related signals, messages, or both may comprise information on time to next work vehicle service, information related to operational time of the work vehicle, components therein, information on work vehicle ground speed/velocity, information on work vehicle engine speed/velocity, or a combination thereof.

In other embodiments the at least one state parameter comprises a sixth state parameter related to the operational status of the implement. The local control element is then arranged to monitor the signals obtained by the first sensor, the second sensor, the work vehicle, or a combination thereof related signals or messages and to form the sixth state parameter based on the monitoring of the signals.

In other embodiments the local control element is arranged to form the sixth state parameter when at least one of the sensor signals has exceeded a predetermined value for a predetermined amount of time.

In other embodiments the local control element is arranged to receive an operator control signal via the digital interface.

In other embodiments the operator control signal comprises a request for at least one state parameter. The local control element is then arranged to obtain said state parameter and feed it to the digital interface.

In other embodiments the operator control signal comprises information identifying a task to be performed and wherein the local control element comprises a task planning element arranged to request at least one state parameter in accordance with a set of rules associated to the task to be performed and to feed the at least one state parameter obtained in response to the request to the digital interface.

The local control element may be connected to a wireless communication element. The wireless communication element may be arranged to communicate by means of Bluetooth, WiFi, radio, or a combination thereof.

The local control element is in different embodiments arranged to feed obtained sensor signals/and or at least one state parameter and/or signals or messages recovered from the work vehicle to the wireless communication element. The wireless communication element may in turn be arranged to feed data to a data storage and processing system. The wireless communication element may also or instead be arranged to feed data to a mobile application having access to the data storage and processing system.

In some embodiments, the local control element is arranged to receive a sensor signal from a sensor arranged at a working tool attached to the implement, wherein said local control element is arranged to calculate the at least one state parameter based on the obtained working tool sensor signal.

In another embodiment, the implement further comprises a digital working tool interface for communication with at least one working tool sensor, a local working tool control element at the working tool, wherein the digital working tool interface is connected to the local control element, or both.

The present disclosure also relates to a work vehicle arrangement. The work vehicle arrangement comprises a work vehicle and an implement as disclosed above.

The work vehicle arrangement comprises an operator interface. The operator interface may comprise a display arranged to display the at least one state parameter.

The operator interface may comprise an operator input element for input of a request for the state parameter, a request for a task to be performed, or both.

The present disclosure further relates to a method for obtaining information related to an implement, said method being performed at said implement connectable to a work vehicle, said implement comprising at least one first sensor, a digital interface to the work vehicle and a local control element connected to said interface. The method comprises the steps of: receiving at the local control element obtained sensor signals; calculating at the control element a state parameter related to the implement based on the obtained sensor signals and feeding the calculated state parameter to the digital interface.

The present disclosure further relates to software for obtaining information related to an implement, said software being adapted to perform the method above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF EMBODIMENTS

Figure 1:
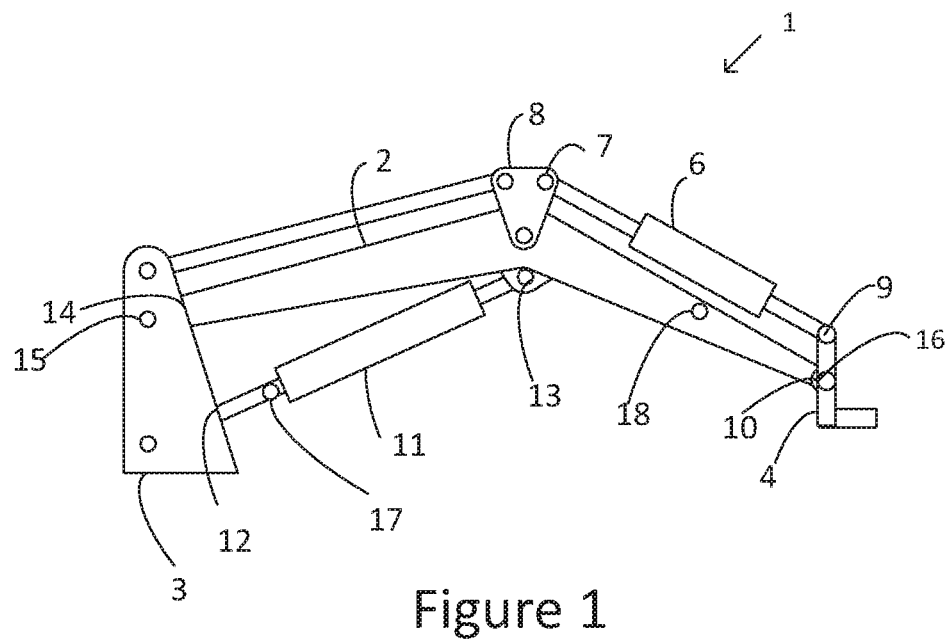
FIG. 1 illustrates an example of an implement attachable to a work vehicle.

Embodiments of the present disclosure will be described more fully hereinafter with reference to the accompanying drawings. The apparatuses and methods disclosed herein can, however, be realized in many different forms and should not be construed as being limited to the embodiments set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In FIG. 1 an implement 1 connectable to a work vehicle is illustrated. The implement, or loader, forms an elongated working tool carrier. The implement may be a front loader.

In the illustrated example, the implement comprises an arm 2. A fastening arrangement 3 is arranged at a first part of the arm. The fastening arrangement is connectable to the work vehicle. The fastening arrangement is in one example attached in relation to the arm 2 such that the arm can be moved in relation to the work vehicle. For example, the fastening arrangement 3 may be pivotally arranged in relation to the work vehicle. Thereby the arm can be made to make a pivoting movement in relation to the work vehicle around the pivot axis of the fastening arrangement.

The implement further comprises an attaching arrangement 4 connected to a second part of the arm 2. The attaching arrangement 4 is attachable to a working tool 5. The attaching arrangement 4 is in one example attached in relation to the arm 2 such that the attachment arrangement possibly with the working tool can be moved in relation to the arm 2. For example, the attaching arrangement 4 may be pivotally arranged in relation to the arm. Thereby the attaching arrangement 4 can be mad to make a tilting movement in relation to the arm.

In the illustrated example, the arm 2 is an elongated arm. The arm is in the illustrated example rigid. The arm is on one example straight. The arm has in one example an elbow. The arm may comprise a plurality of elongated supporting arms connected to each other by transverse supports.

In the illustrated example, the implement comprises a first hydraulic cylinder arrangement 6. The first hydraulic cylinder arrangement 6 is when actuated arranged to cause the implement to carry out at least one first function. In the example, the at least one first function comprises a control of the attachment arrangement, and consequently a working tool attached thereto, in relation to the arm 2. Thus, movement of the attaching arrangement, and the working tool, when attached, can be controlled by the first hydraulic cylinder arrangement 6. The attachment arrangement 4 and the working tool 5 can be controlled to perform a tilting movement. In the illustrated example, the first hydraulic cylinder arrangement 6 is at its first end 7 attached to the arm. The first hydraulic cylinder arrangement 6 is for example mounted to the arm 2 at the middle of the arm. The first hydraulic cylinder arrangement 6 is in the illustrated example at its first end 7 mounted at an elbow of the arm. In the illustrated example, the first hydraulic cylinder arrangement 6 is at its first end 7 mounted to a support 8 mounted at the arm. In one example, the first cylinder arrangement 6 comprises a pair of first hydraulic cylinders. In one example the first cylinder arrangement comprises one first hydraulic cylinder. When the arm comprises a plurality of elongated supporting arms connected to each other by transverse supports, one or a plurality of first cylinders can be mounted to each of the supporting arms.

Further, in the illustrated example, the first hydraulic cylinder arrangement 6 is at its second end 9 attached to the attaching arrangement 4 for attachment to the working tool 5. In one example, the first hydraulic cylinder arrangement 6 extends in parallel with the arm 2. Thus there is a radial distance between a point of (pivoting) attachment 10 of the attachment arrangement to the arm 2 and the point of attachment 9 of the first hydraulic cylinder arrangement 6 to the attachment arrangement 4. Thereby the attachment arrangement 4, and working tool 5 when attached, performs a pivoting movement in relation to the arm 2 as the piston(s) of the hydraulic cylinder arrangement 6 is extracted/retracted. In one example, the point of attachment of the second end 9 of the first hydraulic cylinder arrangement is straight above the point of attachment 10 of the attachment arrangement 4 at the arm 2. In one example, the attachment is such that the attachment arrangement 4 can perform a rotating movement in relation to the arm 2.

In the illustrated example, the implement 1 comprises further a second hydraulic cylinder arrangement 11. The second hydraulic cylinder arrangement 11 is when actuated arranged to cause the implement 1 to carry out a second function. In the illustrated example, the at least one second function comprises movement of the arm 2 in relation to the work vehicle, when the implement 1 is attached to the work vehicle. The arm 2 may be moved in a generally vertical direction in relation to the work vehicle. Movement of the arm 2 can be controlled by said second hydraulic cylinder arrangement 11. The arm 2 can be controlled to perform a pivoting movement. In the illustrated example, the second hydraulic cylinder arrangement 11 is at its first end 12 attached to the fastening arrangement 3. Further, in the illustrated example, the second hydraulic cylinder arrangement 11 is at its second end 13 attached to the arm 2. The first end 12 is attached to the fastening arrangement 3 at a radial distance from an attachment point 14 of the arm. Thereby, the arm 2 of the implement is caused to perform a movement upon action/retraction of the piston(s) in the second hydraulic cylinder arrangement 11. In one example, the first end 12 is attached to the fastening arrangement 3 vertically in relation to the attachment 14 of the arm to the fastening arrangement 3. In accordance with this example, the arm 2 of the implement 1 is caused to perform a lifting/lowering movement upon extraction/retraction of the positon(s) of the second hydraulic cylinder arrangement 11. In one example, the second cylinder arrangement 11 comprises a pair of second hydraulic cylinders. In one example the second cylinder arrangement comprises one second hydraulic cylinder. When the arm comprises a plurality of elongated supporting arms connected to each other by transverse supports, one or a plurality of second cylinders can be mounted to each of the supporting arms.

The first and/or second hydraulic cylinder arrangements 6, 11 are connected to a respective hydraulic circuit on the work vehicle, when the implement is attached to the work vehicle. The respective hydraulic circuit carries fluid to the corresponding at least one cylinder based on control from a hydraulic control valve at the work vehicle.

Different working tools 5 can be attached to the implement, such as a bucket, a bale handler etc.

An example of a working tool attachable to the implement is a standard bucket for transporting bulk material. The first cylinder arrangement 6 may be arranged to pivot the bucket. The second hydraulic cylinder arrangement 11 may be arranged to raise and lower the arm and consequently the bucket attached thereto.

Further, one or a plurality of sensors 15, 16, 17 are arranged at the implement. In the illustrated example, one sensor 15 is arranged to obtain signals relating to the rotational position of the arm of the implement in relation to the working tool. In the illustrated example, one sensor 16 is arranged to obtain signals relating to the rotational position of the tool in relation to the implement. In one example, one or a plurality of sensors 17 is arranged to obtain signals related to a pressure in the second cylinder arrangement 11.

Further, the implement comprises a local control element 18. The local control element is in the illustrated mounted at the arm 2. However, it can be mounted anywhere at the implement 1.

Figure 2:
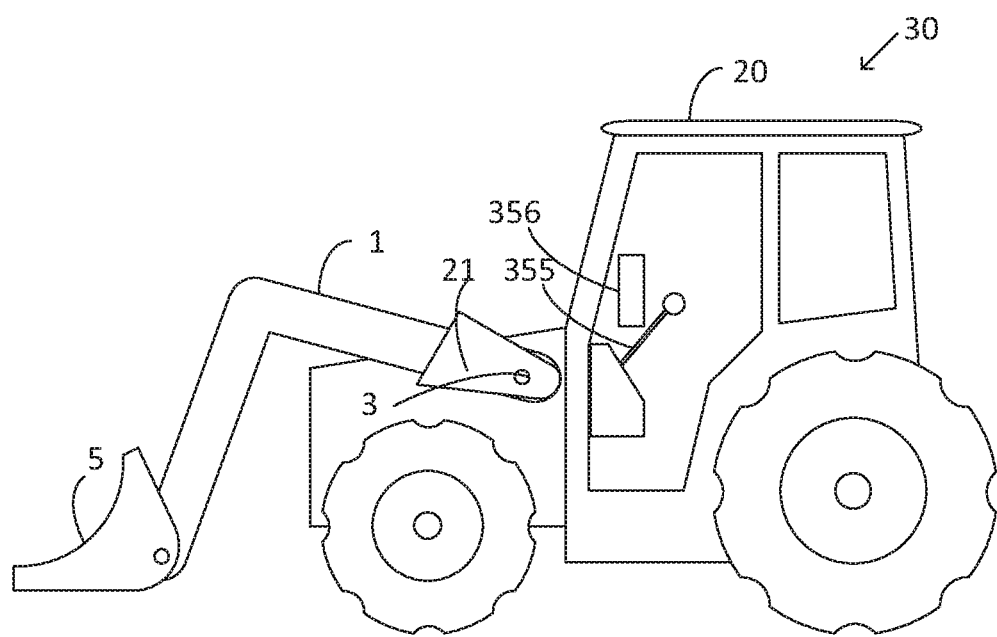
FIG. 2 illustrates an example of a work vehicle arrangement comprising a work vehicle and an implement attached thereto.

In FIG. 2, a work vehicle arrangement 30 is illustrated. The work vehicle arrangement 30 comprises a work vehicle 20 comprising a fastening arrangement 21 connectable to an implement 1, and said implement 1. The implement has a cooperating fastening arrangement 3 which fastens to the fastening arrangement 21 of the work vehicle. The implement 1 may be detachably fastened to the work vehicle. The implement may be fastened to the work vehicle such that the implement is rotatable around its points(s) of attachment in relation to the work vehicle in at least one direction.

The implement 1 may have the features as discussed in relation to FIG. 1. The work vehicle 20 is arranged to support hydraulics to the function of the implement when said implement is connected to the work vehicle and the hydraulic system is pressurized.

The implement is provided with at least one first sensor arranged to obtain sensor signals related to the at least one first hydraulic function of the implement. The implement is further provided with a digital interface to the work vehicle.

The implement has a local control element in communication with the digital interface. The local control element is arranged to receive the obtained sensor signals, to calculate a state parameter related to the implement based on the obtained sensor signals and to feed the calculated state parameter to the digital interface. The digital interface is arranged to transmit the received state parameter to the work vehicle.

The work vehicle may comprise an operator interface. The operator interface comprises in the illustrated example a display 356 arranged to present information related to the obtained sensor signals. The display may be a display with input means. The term "display with input means" is intended to include all both display with built-in input means and displays with input means connected thereto. Different examples of displays include displays with a touch screen or displays with or connected to a key board. The display may be a mobile device with a display such as a PDA (Personal Digital Assistant).

The display may be connected to the digital interface. The digital interface is then arranged to transfer the state parameter to the display.

The operator interface comprises in the illustrated example an operator input element 355 such as a joystick. The joystick may be provided with buttons and/or a scroll wheel, etc.

The work vehicle can be any type of work vehicle such an agricultural work vehicle such as a tractor.

In the illustrated example the work vehicle is a tractor. In the illustrated example the implement is a front loader.

The work vehicle further comprises a vehicle control element for control of vehicle functions. The vehicle control element is characteristically a distributed system of control nodes arranged to communicate with each other by means of a digital data bus. In one example, the vehicle control element is arranged to control supply of hydraulic fluid to hydraulic functions of the implement. In one example, the control of supply of hydraulic fluid to hydraulic functions of the implement is substantially performed by the local control element.

Figure 3:
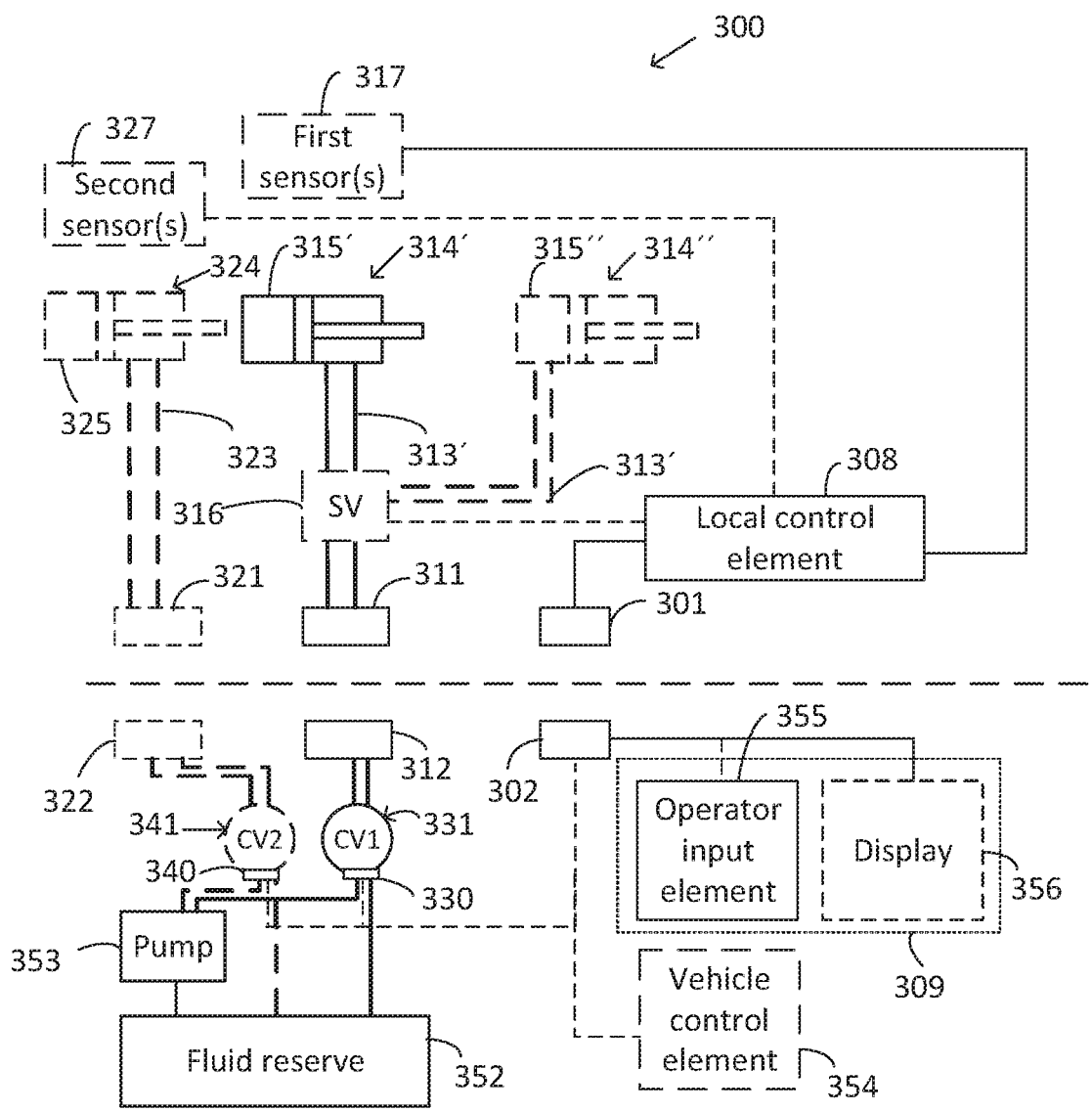
FIG. 3 illustrates a first hydraulic/electric circuit diagram for controlling an implement according to a first example.

In FIG. 3, an example of a hydraulic and electric circuit diagram 300 for obtaining information related to an implement connected to a work vehicle is illustrated. The example relates to a situation wherein a local control element at the implement controls supply of hydraulic fluid to one or a plurality of hydraulic functions of the implement. However, this is only intended as an example. The control of supply of hydraulic fluid to one or a plurality of hydraulic functions at the implement can likewise be performed at a work vehicle control element.

The diagram comprises parts located on the work vehicle and parts located on the implement. A dashed line horizontally dividing the Figure in two parts shows an example of which parts can be located on the work vehicle and which parts can be located on the implement.

In the illustrated example, the implement part comprises a first hydraulic connection 311 connectable to the work vehicle. The first implement hydraulic connection 311 is connectable to the work vehicle by means of a corresponding first vehicle hydraulic connection 312. First hydraulic circuits 313', 313" are when the first implement hydraulic connection 311 is connected to the corresponding first vehicle hydraulic connection 312 configured to carry hydraulic fluid via said first hydraulic connections 311, 312 to at least one first hydraulic function 314', 314". In the illustrated example the at least one first function 314', 314" is carried out by means of actuation of a first hydraulic cylinder arrangement 315', 315". In FIG. 1, examples are given related to the mounting of the first cylinder arrangement at the implement. When there is more than one first function, a common first hydraulic cylinder is in one example adapted to carry out the first functions (not illustrated). Alternatively, as is illustrated in FIG. 3, different cylinders 315', 315" are used for carrying out the different first hydraulic functions 314', 314". Thus, the respective cylinder of the first hydraulic cylinder arrangement 315', 315" is connected to the first implement hydraulic connection 311 for controlled supply of pressurized fluid to the associated first hydraulic function for control of the first hydraulic function.

The at least one first hydraulic function 314', 314 may comprise a function 314' for movement of the working tool in relation to the implement. The at least one first hydraulic function may further comprise a further function 314" such as a hydraulic working tool lock mounted in parallel with the function for movement of the working tool.

In the illustrated example, the first hydraulic circuit 313' is connectable to at least one further first hydraulic circuit 313" by means of switch means 316. The switch means comprises in one example a switch valve and/or selector valve.

The implement part may also comprise a second hydraulic connection 321 connectable to the work vehicle. The second implement hydraulic connection 321 is connectable to the work vehicle by means of a corresponding second vehicle hydraulic connection 322. A second hydraulic circuit 323 is when the second implement hydraulic connection 321 is connected to the corresponding second vehicle hydraulic connection 322 configured to carry hydraulic fluid via said first hydraulic connections 321, 322 to at least one second hydraulic function 324. In the illustrated example the at least one second function 324 is carried out by means of actuation of a second hydraulic cylinder arrangement 325. In FIG. 1, examples are given related to the mounting of the second cylinder arrangement 325. When there are more than one second function, a common second hydraulic cylinder can in one example adapted to carry out the second function. Alternatively, different cylinders can be used for carrying out the different second functions 324. Thus, the second hydraulic cylinder arrangement 325 is connected to the second implement hydraulic connection 321 for controlled supply of pressurized fluid to the second hydraulic function for control of the at least one second hydraulic function. The at least one second hydraulic function 324 may comprise a function for liftering/lowering of the implement.

In the illustrated example, at least one first sensor 317 is arranged on the implement. The at least one first sensor 317 is arranged to obtain sensor signals at least related to the at least one first hydraulic function 314', 314". The at least one first sensor 317 may comprise a sensor arranged to obtain signals related to the rotational position of the working tool in relation to the implement. The at least one first sensor may be arranged to sense a pivotal position of the working tool in relation to the implement. The at least one first sensor may comprise a radial Hall sensor. Alternatively, or in addition thereto, the at least one first sensor arranged to obtain signals related to the rotational position of the working tool in relation to the implement comprises a linear sensor. The rotational position can be calculated based on the signals obtained by the linear sensor.

Further, the at least one first sensor 317 may comprise at least one pressure sensor arranged to obtain signals related to a hydraulic pressure. The at least one a pressure sensor may be arranged to sense at least one pressure related to the first cylinder arrangement 315', 315". For example the at least one first pressure sensor comprises pressure sensors sensing the pressure of the respective chamber within at least one of the cylinders of the first hydraulic cylinder arrangement 314', 314". There is a relation between the hydraulic pressure, force exerted by the hydraulic cylinder. Further, there is a relation between the force exerted and a load at least partly carried by the cylinder. These relations can be used to obtain information related to the implement and/or a load carried by the working tool on the implement.

Instead or in addition thereto, the at least one first pressure sensor 317 comprises pressure sensors sensing the pressure in the two lines of at least one of the first hydraulic circuit(s) 313', 313". When two pressure sensors are used for obtaining signals related to a hydraulic pressure and those two pressure sensors are arranged to obtain signals related to the hydraulic pressure on both sides of the hydraulic cylinder, a difference pressure can be determined. This difference pressure defines the force exerted by the hydraulic cylinder. The effect of any back pressure or counter pressure is then accounted for.

At least one second sensor 327 may further be arranged on the implement. The at least one second sensor 327 is arranged to obtain sensor signals related to the second hydraulic function 324. The at least one second sensor 327 may comprise a sensor arranged to sense the rotational position of the implement in relation to the work vehicle. The at least one second sensor 327 may be arranged to sense a pivotal position of the implement in relation to the work vehicle. The at least one second sensor 327 may comprise a radial Hall sensor.

Alternatively, or in addition thereto, the at least one second sensor arranged to obtain signals related to the rotational position of the working tool in relation to the implement comprises a linear sensor. The rotational position can be calculated based on the signals obtained by the linear sensor.

Further, the at least one second sensor 327 may comprise at least one pressure sensor arranged to obtain signals related to a hydraulic pressure. The at least one a pressure sensor may be arranged to sense at least one pressure related to a pressure of the at least one cylinder of the second hydraulic cylinder arrangement. For example the at least one second pressure sensor comprises pressure sensors sensing the pressure of the respective chamber within the cylinder. As stated above in relation to the first pressure sensor(s), there is a substantially linear relation between the pressure and the load, at least when the rotational position of the arm in relation to the work vehicle is within certain ranges, and this relation can be used to determine the load.

Instead or in addition thereto, the at least one second pressure sensor comprises pressure sensors sensing the pressure in the two lines in the second hydraulic circuit. When two pressure sensors are used for obtaining signals related to a hydraulic pressure and those two pressure sensors are arranged to obtain signals related to the hydraulic pressure on both sides of the hydraulic cylinder, a difference pressure can be determined. This has as stated above in relation to the first pressure sensor(s) the effect that a back pressure or counter pressure can be accounted for.

The implement part of the system comprises further a local control element 308. The implement part of the system comprises further a digital interface part 301 connectable to the work vehicle. The implement digital interface part 301 is connectable to the work vehicle by means of a corresponding vehicle digital interface part 302. When the digital interface parts are connected, digital communication between the work vehicle and the local control element 308 of the implement is provided. The communication can be wired or wireless or a combination thereof.

The local control element 308 is arranged to receive the obtained sensor signals, to calculate at least one state parameter related to the implement based on the obtained sensor signals and to feed the calculated at least one state parameter to the digital interface. The operation of the local control element is exemplified later in this disclosure.

The digital interface is arranged to transfer the calculated at least one state parameter to the work vehicle.

The local control element 308 may be arranged to receive an operator control signal via said digital interface for operator control of the at least one first function and possibly also the second function, if present. The local control element 308 may then be arranged to determine a control signal adapted to control at least one vehicle control valve 331, 341 at the work vehicle based on said operator control signal, and to transmit said control signal to the digital interface 301, 302. In the illustrated example, a first 331 of the vehicle control valves controls the first hydraulic circuits 313', 313". Further, a second 341 of the vehicle control valves controls the second hydraulic circuit 323. The vehicle control valves will be described more in detail below.

The local control element 308 may further be arranged to obtain a control signal adapted to control operation of at least one additional control valve 316 at the implement based on said operator control signal, and to feed said control signal to said at least one additional control valve. The operator control signal may comprise a selector signal. The least one additional control valve 316, 516', 516" may comprise a switch valve arranged to switch between opening/closing based on the selector signal, The least one additional control valve 316, 516', 516" may comprise a selector valve arranged to select hydraulic circuit based on the selector signal.

Thereby one of the first hydraulic circuits 313', 313" can be selected for supply of pressurized fluid. As is clear from the above, the additional control valve 316 is electrically connected to the local control element.

Further, the local control element may be supplied with a power supply such as by means of a 12V or 24V battery. The signals provided from the local control element to the additional control valve(s) may then have enough power to be able to drive the additional control valve(s). No individual power signal from the work vehicle is required for each additional control valve.

The local control element 308 may further be arranged to receive the obtained sensor signals and to determine the control signal adapted to control at least the at least one control valve 331, 341, and possible additional control valve(s), based on the obtained sensor signals. Thus, the local control element is arranged to receive the obtained first and/or second sensor signals and to determine the control signal adapted to control at least the at least one control valve, and possible additional control valve(s) based on the obtained first and/or second sensor signals.

The local control element 308 comprises in one example a control module, wherein the desired output, i.e. the behaviour of the first at least one and possible second hydraulic function is based on operator input to the control module. The input to the control module may be an operator signal. Thus, the control module is then controlled by direct operator control. The direct operator control may for example be provided by means of a joystick. Alternatively, the control module is controlled by means of indirect operator control. In indirect operator control, then local control element 308 may be arranged to generate signals according to a task planning scheme for example based on operator input by means of the operator interface such as said joystick or a display with input means. The control module may comprise a feedback loop that allows for feedback and self-correction. The operation is adjusted according to differences between the actual output as measured by the sensors and the desired output value.

Other known functions for control can be used. For example, the feed-back loop can be substituted or complemented with feed forward or model based control or open loop control.

In the illustrated example, the work vehicle part of the implement comprises a pump 353 and a fluid reservoir 352. The first vehicle control valve 331 is connected to the pump 353 and fluid reserve 352. The first vehicle control valve 331 is configured to control hydraulic fluid for the at least one first hydraulic function 314', 314". When the first implement hydraulic connection 311 is connected to the first vehicle hydraulic connection 312, hydraulic fluid is carried to the at least one first hydraulic function 314', 314" based on control from the first control valve 331. Operation of the first control valve 331 is controlled from the local control element 308 by signals received over the digital interface 301, 302.

Further, the second vehicle control valve 341 may be connected to the pump 353 and fluid reserve 352. The second vehicle control valve 341 may be configured to control hydraulic fluid for the at least one second hydraulic function 324. When the second implement hydraulic connection 321 is connected to the second vehicle hydraulic connection 322, hydraulic fluid can be carried to the at least one second hydraulic function 324 based on control from the second control valve 341. Operation of the second control valve 341 is controlled from the local control element 308 by operator control signals received over the digital interface 301, 302.

Figure 10:
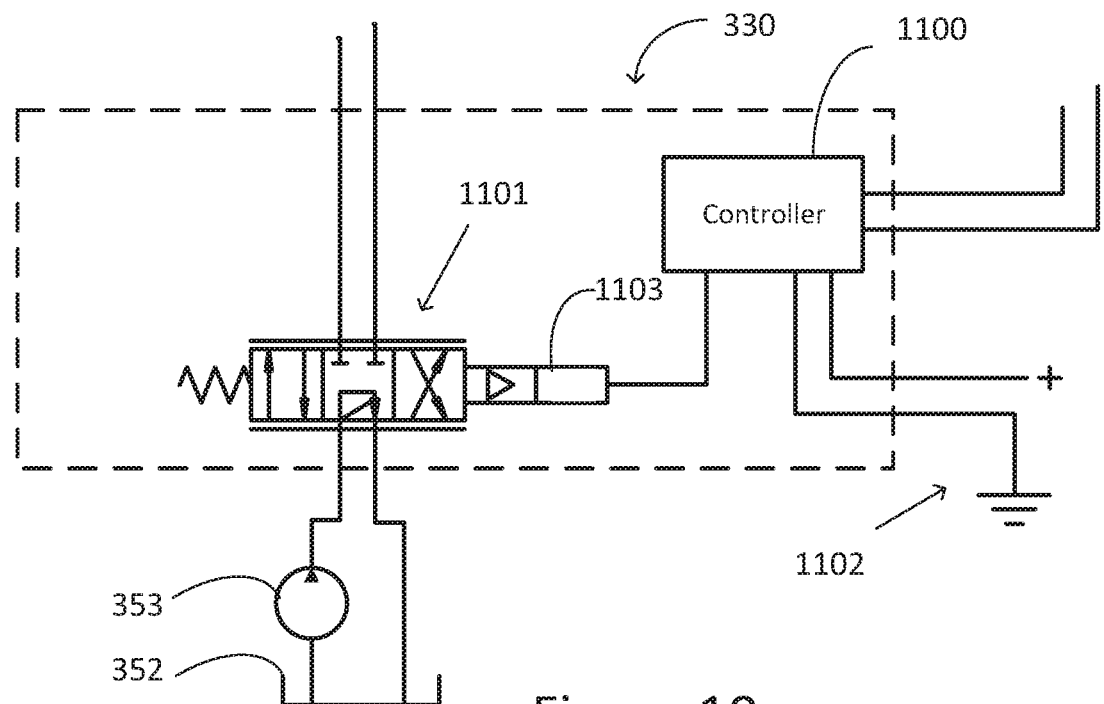
FIG. 10 is a scheme schematically illustrating an example of a regulator of or connected to a control valve according to one example.

In the illustrated example, the respective vehicle control valve 331, 341 comprises a regulator 330, 340 arranged to receive the signals received over interface and to control the action of the vehicle control valve based on the received signals. The regulator is arranged to control a direction of flow of the hydraulic fluid within the hydraulic circuit and the flow rate (m$^3$/s) of the hydraulic fluid based on the received signals. An example of a regulator is shown in FIG. 10.

In one example, the vehicle control valves 331, 341 are general purpose control valves adapted to support the hydraulic functions of the work vehicle. In accordance one or more additional hydraulic consumers (not shown) are connected to a hydraulic circuit fed by the hydraulic fluid by means of said general purpose vehicle control valves. When the implement is installed at a work vehicle where pre-installed or general purpose vehicle control valves, a gateway can be provided for directing the control signals from the local control element to the vehicle control valve(s). This may involve that the gateway is arranged to override functions in the work vehicle for controlling the first and possible second hydraulic functions.

In the illustrated example the gateway is implemented at a vehicle control element 354. The vehicle control element 354 is characteristically a distributed system of control nodes arranged to communicate with each other by means of a digital data bus.

The local control element may be connected to the gateway, or vehicle control element either via the digital interface or via a separate analogue or digital communication line (not shown) between the local control element and gateway, or vehicle control element 354.

Alternatively the vehicle control valves are control valves dedicated for control of hydraulic functions of the implement or working tool(s) attached thereto. In accordance with this example, the work vehicle can be clean from devices for control of implement, when the work vehicle is not provided with an implement. When an implement is to be attached to the work vehicle, the dedicated control valves are mounted to the pump and reserve of the work vehicle and the implement is mounted to the work vehicle.

In the illustrated example, the control valves are mounted at the vehicle part of the arrangement. However, the hydraulic connection(s) 311, 312, 321, 322 may instead be arranged between the control valve(s) 331, 341 at one hand, and the pump 353 and hydraulic reserve 352 at the other hand. The control valve(s) may then be arranged at the implement.

The vehicle control valves for control of the implement can in accordance with these examples with dedicated control valves be adapted for control of the implement functions. No adaptations to other possible hydraulic consumers (having other requirements) are necessary. Further, the function of the local control element for control of the vehicle control valves is adapted to the implement on which it is mounted. Further, the function of the local control element for control of the vehicle control valves may also be adapted to the characteristics of the vehicle control valve(s) it is adapted to control The control signals for control of the first and possible second control valves 331, 341 may state above received over the digital interface 301, 302. Alternatively the control signal is transmitted to the control valve over a separate line. This would characteristically involve that the signal is transmitted to the control valve via the gateway. The vehicle part of the system comprises a channel from communication of the control signals from the digital interface or gateway to the first and possible second control valve 331, 341. The channel is a digital channel. The digital channel is in one example a wireless channel. The digital channel is in one example a wired channel. The communication of signals may be performed by way of a digital data bus. Said digital data bus connects characteristically a plurality of nodes within the work vehicle. The communication over the digital channel, or data bus, is performed in accordance with a communication protocol. For example the communication may be by way of CAN.

The work vehicle part comprises further an operator interface 309 for operator monitoring and/or control of the implement. The operator interface 309 is arranged to communicate with the digital interface. The vehicle part of the system comprises a channel for communication of the operator control signals to the digital interface. The channel is in one example a digital channel. The digital channel is in one example a wireless channel. The digital channel is in one example a wired channel. The signals may be communicated, as stated above, by way of a digital data bus. Said digital data bus connects as stated above characteristically a plurality of nodes within the work vehicle. The communication over the digital channel, or data bus, is performed in accordance with a communication protocol. For example the communication may be by way of CAN.

The gateway may be arranged to direct signals from the operator interface intended for the local control element to said local control element via the digital interface.

Further, the operator interface arranged to receive the at least one state parameter and possibly transmitting operator control signals to the local control element may be a general purpose operator interface. Thus, the general purpose operator interface may be adapted for user control of other functions than the functions as disclosed herein. Further, the general purpose operator interface may be adapted for display of other functions than at least one state parameter. In accordance with these embodiments, when the implement is installed at a work vehicle, where pre-installed or general purpose vehicle interface(s) are to be used, the gateway can be provided for directing the operator control signals from the operator interface intended for the local control element to said local control element via the digital interface. This may involve that the gateway is arranged to override transfer of the operator control signals to other functions of the work vehicle. Further, the gateway can be provided for directing state parameter signals and other signals from the local control element to the operator interface. This may involve that the gateway is arranged to override transfer of signals from other functions of the work vehicle to the operator interface.

In the illustrated example the gateway is as stated above implemented at a vehicle control element 354, which characteristically is a distributed system of control nodes arranged to communicate with each other by means of a digital data bus.

The gateway, or vehicle control element is arranged to direct the operator control signals to the local control element via the digital interface.

In one example, the digital interface comprises a contactless interface device or probe to probe or recover information from a CAN network of the work vehicle. The contactless probe is arranged to monitor the traffic on the CAN network and to recover signals or messages having predetermined characteristics. The contactless probe may be arranged to recover signals exchanged on the data bus comprising at least the operator control signal.

In this way, the implement becomes even more flexible to be mounted to virtually any work vehicle. Implements with advanced control functionality can be mounted to any work vehicle having a CAN network. This contactless interface is suitable for aftermarket installation without any effect on the integrity of the work vehicle. For example, this contactless interface is particularly well suited for attachment to pre-owned work vehicles.

As work vehicles such as agricultural tractors today are commonly equipped with distributed electronic control systems, using CAN bus technology to link the different Electronic Control Units of the subsystems together, there is in order to manage the control of the work vehicle, a multitude of different information broadcasted on the CAN network, e.g. sensor data, user input from joysticks and switches, and different data regarding operation of the work vehicles.

Most implements traded are not delivered from factory together with the work vehicle. A more common situation is that the implement for a work vehicle is attached to the work vehicle as a dealer install option. Similarly as with the work vehicles, the control of implements are becoming more advanced, in order to increase the work efficiency and to the convenience for the drivers. This puts increased demand on the information required to control the implements. The use of the contactless interface allows for accessing different sort of information available in the work vehicle data bus. The accessed information can be used to control the implement and/or to provide more powerful functions.

Apart from accessing information related to operator control signals for control of the implement, there is a long list of examples where access of information allows for integration of new functions. The implement functions requiring data from the work vehicle network may include (but not be limited to):

Status of hitch to make sure that implement is not active while operating front or rear hitch.

Status of seat switch for safety purposes, i.e. to make sure that the operator is seated while operating the implement Information on time to next work vehicle service to suggest implement service actions Information of ground speed or velocity for safety functions at high speed The contactless probe comprises a processor connected to a power supply such as a battery. The contactless probe comprises further one or two or more connection clips. When using two connection clips, the first connection may be installed on the line of rising pulse signals. The second connection may be installed on the line of descending pulse signals. The connections are made by clips without contact thus without wire connection, intended to recover the signals exchanged on the digital data bus. The clips may be arranged to ensure coupling of the capacitive type.

As discussed, the operator interface may be or comprise general purpose operator interface parts. Alternatively, the operator interface is an operator interface dedicated for the tasks disclosed herein or comprising dedicated operator interface parts.

The operator interface comprises an operator input element such as a joystick 355. The joystick may be provided with buttons and/or a scroll wheel, etc.

The operator interface comprises in the illustrated example a display 356 arranged to present information related to at least one state parameter of the implement and potentially a working tool attached thereto. The display may be a display with input means. The term "display with input means" is intended to include all both display with built-in input means and displays with input means connected thereto. Different examples of displays include displays with a touch screen or displays with or connected to a key board. The display may be a mobile device with a display such as a PDA (Personal Digital Assistant). The display 356 may be arranged to display information related to the state parameter based on information obtained by the local control element 308 and communicated over the communication channel between the digital interface and operator interface.

The joystick and the display may be arranged to communicate with each other. A communication channel may be a digital channel. The digital channel is in one example a wireless channel. The digital channel is in one example a wired channel. The communication over the digital channel is performed in accordance with a communication protocol. For example the communication may be by way of CAN The vehicle control element 354 is adapted for control of vehicle functions.

In FIG. 10 a vehicle control valve comprises a regulator 330. The regulator 330 is arranged to receive control signals received from a local control element and to control the action of the vehicle control valve based on the received control signals. The regulator 330 is arranged to control a direction of flow of the hydraulic fluid within the hydraulic circuit(s) and the flow rate ($m^3$/s) of the hydraulic fluid based on the received control signals.

In the illustrated example, a controller 1100 of the regulator 330 is arranged to receive the control signals from the local control element either via the digital interface or as an analogue signal. The controller 1100 is arranged to control the flow rate and a flow direction based on the received control signals. The controller 1100 is powered by a power source 1102 and outputs higher power control signals to an actuator 1103 based on the low power input control signals. The actuator in turn controls a proportional valve 1101. The proportional valve is in the illustrated example a bi-directional proportional control valve.

The actuator is for example an electrical motor or a solenoid. The solenoid can be directly connected to the proportional valve. Alternatively, the solenoid is indirectly connected to the proportional valve via a hydraulic circuit. Hence, the proportional valve may be an electrohydraulic valve or a direct operated valve. The proportional valve is in the illustrated example an open center valve. However, it may instead be a closed center valve. The proportional valve is connected to a pump 353 and fluid reserve 352.

The control signals received by the regulator 1100 may be determined by the local control element or by a work vehicle control element. This will be discussed more in detail in relation to FIG. 11.

Figure 4:
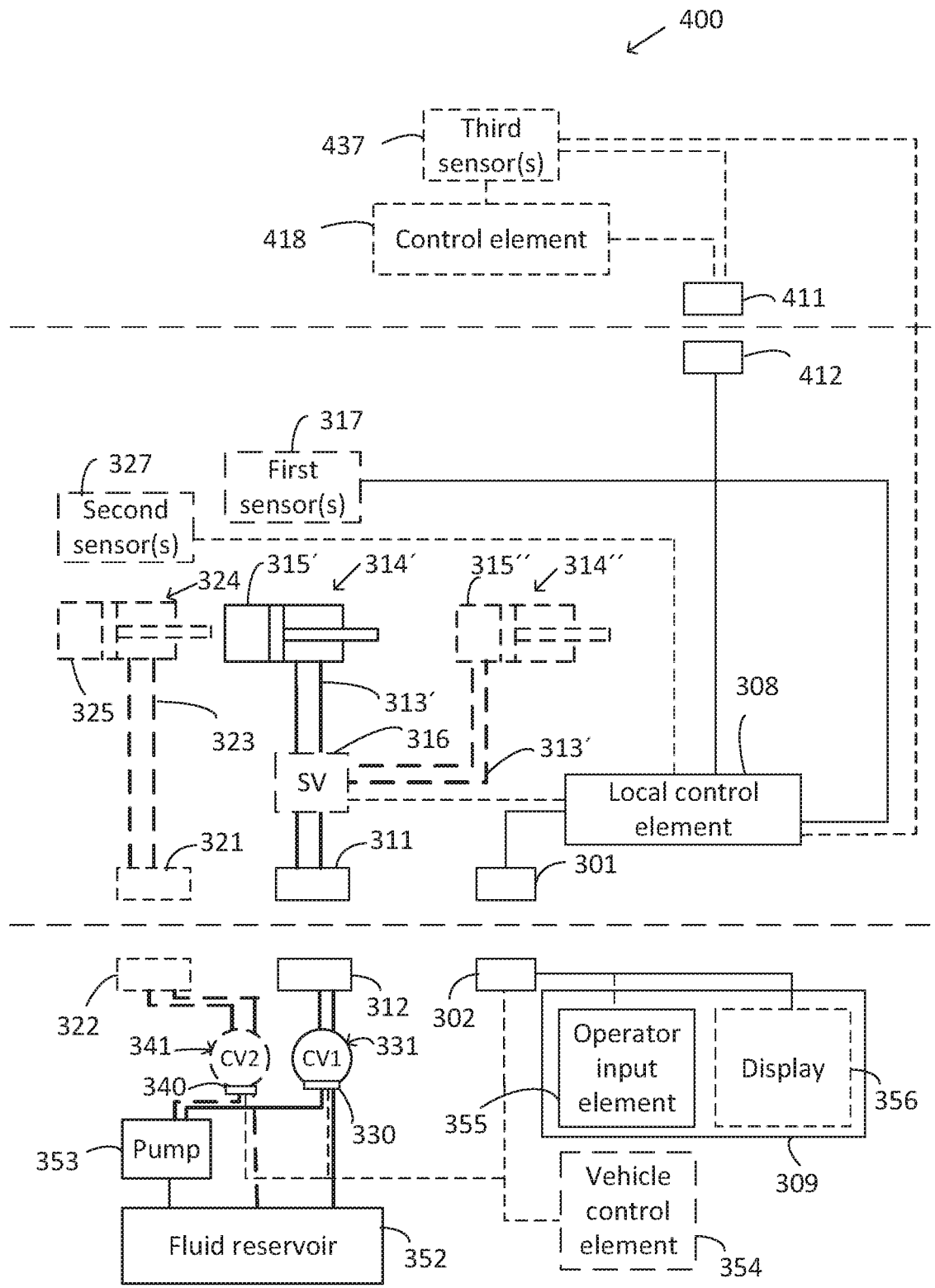
FIG. 4 illustrates a second hydraulic/electric circuit diagram for controlling an implement according to a second example.

In FIG. 4, a hydraulic and electric circuit diagram 400 for obtaining information related to an implement and a tool attached thereto is illustrated, wherein the hydraulic and electric circuits are arranged to control operation of the implement and possibly a tool attached thereto.

As in relation to FIG. 3, the examples relate to a situation wherein a local control element at the implement controls supply of hydraulic fluid to one or a plurality of hydraulic functions of the implement. However, this is only intended as an example. The control of supply of hydraulic fluid to one or a plurality of hydraulic functions at the implement can likewise be performed at a work vehicle control element.

The hydraulic and electric diagram of FIG. 4 corresponds to that of FIG. 3 with the addition that the implement further comprises a digital working tool interface 411, 412 for communication with at least one working tool sensor 437 and/or a local working tool control element 418 at a working tool, when the digital working tool interface 411, 412 is connected to the local control element. The digital working tool interface 411, 412 may be arranged to communicate wirelessly with the at least one working tool sensor 437 and/or a local working tool control element 418 at the working tool. The digital working tool interface 411, 412 may be arranged to communicate with the at least one working tool sensor 437 and/or a local working tool control element 418 by way of a digital channel. As stated above, the digital channel can be a wireless channel or a wired channel. The communication over the digital channel is performed in accordance with a communication protocol. For example the communication may be over CAN.

Alternatively, the at least one working tool sensor 437 may be analogously connected to the local control element of the implement.

In different embodiments (not shown), the implement is configured to carry hydraulic fluid—to at least one third hydraulic function at the working tool. The implement may be arranged to carry hydraulic fluid for example from a third hydraulic connection to the at least one third hydraulic function at the working tool. In one example the local working tool control element 418 is arranged to control said third hydraulic function. Accordingly, the local working tool control element 418 is arranged to form a valve control signal based on an operator control signal received via the digital working tool interface, and to transmit said valve control signal to the digital interface 411, 412 for further communication to the control valve at the work vehicle which controls the at least one third hydraulic function.

In different embodiments, the local working tool control element 418 is arranged to receive sensor signals from the at least one working tool sensor 437. In one example, the local working tool control element 418 is arranged to transmit the received sensor signal to the working tool digital interface 411, 412. Alternatively, the local working tool control element 418 is arranged to calculate a state parameter related to the working tool based on the received sensor signals and to feed the calculated state parameter to the working tool digital interface 411, 412.

In the illustrated example, the digital interface between the implement and the working tool is described as an implement digital interface part 412 and a working tool digital interface part 411 connectable to the implement part 412. When the digital interface parts are connected, digital communication between the local working tool control element 418 and/or the working tool sensors 437, and the local control element 308 is provided.

In different embodiments (not shown), the implement is configured to carry hydraulic fluid for example from a third hydraulic connection to at least one third hydraulic function at the working tool. In one example the local working tool control element 418 is arranged to control said third hydraulic function. Accordingly, the local working tool control element 418 is arranged to form a valve control signal based on an operator control signal received via the digital working tool interface, and to transmit said valve control signal to the digital interface 411, 412 for further communication to the control valve at the work vehicle which controls the at least one third hydraulic function.

Figure 7:
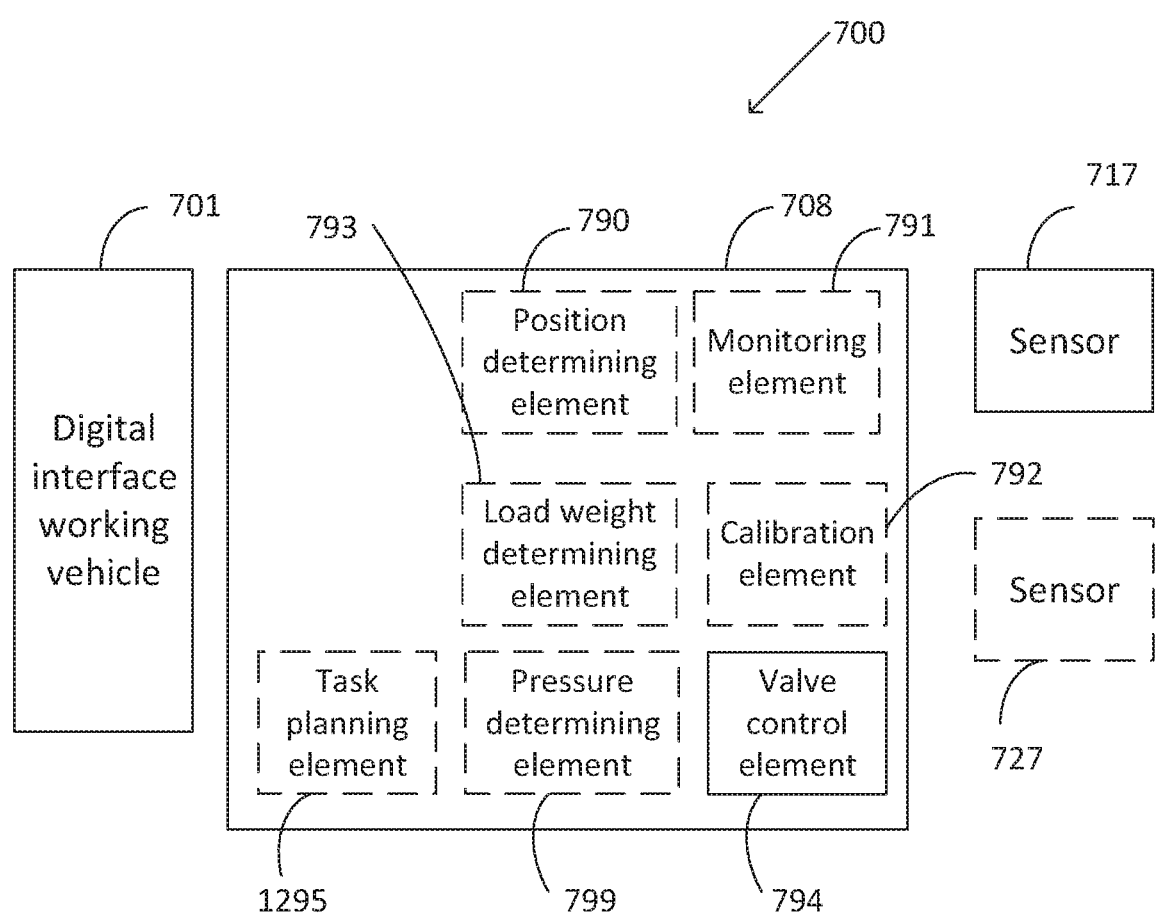
FIG. 7 is a block scheme schematically illustrating examples of functions of a local control element.

In FIG. 7 an example of an implement system 700 is illustrated. The implement system 700 comprises local control element 708 and a digital interface 701 to a work vehicle. The implement system also comprises one or a plurality of sensors 717, 727. The one or plurality of sensors is arranged to obtain sensor signals related to at least one hydraulic function of the implement. The local control element is arranged to receive sensor signals obtained by the at least one sensor 717, 727. The local control element has at least some of the following functionality: position determination, pressure determination, calibration, monitoring, load weight determination and/or valve control.

Thus, the control element 708 may be arranged to, among other things, calculate a state parameter related to the implement based on the obtained sensor signals and to feed the calculated state parameter to the digital interface 701. The digital interface 701 arranged to feed the calculated state parameter to the work vehicle, for example to an operator interface of the work vehicle.

The local control element may comprise a position determining element 790.

In one example, the at least one hydraulic function of the implement comprises a movement of a tool in relation to the implement, and the at least one sensor comprises a sensor arranged to obtain signals relating to the rotational position of the working tool in relation to the implement. The position determining element 790 may then be arranged to calculate a first state parameter related to the position and/or velocity and/or acceleration of the tool in relation to the implement. The first state parameter may comprise relative position of the working tool in relation to the implement. The position determining element 790 may then be arranged to calculate the relative position based on the obtained sensor signal relating to the rotational position of the tool in relation to the implement and based on a maximum rotational position of the tool in relation to the implement. Thus, the relative position may be a percentage of maximum rotation. The rotational position of the tool in relation to the implement may be given as a tilt angle. The maximum rotational position is characteristically known for example by measurements. The implement and/or working tool has information related to the maximum rotational position.

In one example, the at least one hydraulic function of the implement comprises movement of the implement in relation to the work vehicle, and the at least one sensor is arranged to obtain sensor signals relating to the rotational position of the implement in relation to the work vehicle. The position determining element 790 may then be arranged to calculate a second state parameter relating to the position and/or velocity and/or acceleration of the implement in relation to the work vehicle. Thus, the relative position may be a percentage of maximum rotational position. The rotational position of the tool in relation to the work vehicle is to be understood as a height and orientation of the implement in relation to the work vehicle. The implement has information related to the maximum rotational position. The maximum rotations position is characteristically known for example by measurements. An example of this is discussed below.

The position determining element 790 may be arranged to calculate a third state parameter related to the position (i.e. orientation and height) and/or velocity and/or acceleration of the working tool in relation to the work vehicle. The position determining element 790 is then arranged to calculate the position of the working tool in relation to the work vehicle based on the obtained sensor signals relating to the rotational position of the implement in relation to the work vehicle, based on the obtained signals relating to the rotational position of the working tool in relation to the implement and based on geometrical calculations. The implement has characteristically information about its dimensions and geometry. This can be used in determining the position of the working tool in relation to the work vehicle.

The local control element 708 may further be arranged to comprise a pressure determining element 799. The pressure determining element 799 is arranged to receive at least one pressure signal obtained by at least one pressure sensor, wherein at least one of the sensors 717, 727 are pressure sensors arranged to obtain signal(s) related to hydraulic pressure(s) in one or more hydraulic circuits of the implement. Different ways of obtaining hydraulic pressures are for example disclosed herein. The pressure determining element 799 is arranged to calculate at least one fourth state parameter related to the hydraulic pressure or a pressure change related to at least one hydraulic function of the implement and/or working tool attached thereto.

In one example, the pressure determining element 799 may be arranged to calculate the fourth state parameter as a relative hydraulic pressure based on the obtained signal related to the hydraulic pressure and based on a maximum pressure. The maximum pressure is characteristically a maximum system pressure of a hydraulic cylinder of the hydraulic circuit in which the hydraulic pressure is obtained by means of the pressure sensor. The implement has information related to the maximum pressure(s). The maximum hydraulic pressure(s) are characteristically known for example by measurements. An example of this is discussed below.

The local control element 708 may further comprise a load weight determining element 793. The load weight determining element 793 is arranged to calculate a fifth state parameter related to a weight of a load carried by a working tool attached to the implement. The load weight determining element 793 is arranged to calculate the load weight based on a known relation between the load weight and the hydraulic pressure and based on the signal obtained by the pressure sensor. The obtained hydraulic pressure may relate to a hydraulic pressure in the hydraulic circuit(s) and or hydraulic cylinder(s). The known relationship is measured or calculated, or a combination thereof. The known relation may be determined based on geometrical calculations and/or a calibration process.

The load weight determining element 793 may be arranged to record an obtained hydraulic pressure related to the lifting cylinders during lift of the load. The load weight determining element is then arranged to determine the load weight based on the recorded pressures during the lift.

The load weight determining element 793 is in one example arranged to obtain signals relating to the rotational position of the implement in relation to the work vehicle, to obtain signals relating to the rotational position of the tool in relation to the implement, to obtain signals relating to the hydraulic pressure, and to calculate the fifth state parameter related to the weight of the load carried by the working tool based on said obtained sensor signals.

The local control element may be arranged to determine whether the calculated at least one state parameter fulfils pre-set requirement(s) and when the pre-set requirement(s) are not fulfilled, obtain an implement status report informing that the calculation of the state parameter does not fulfil pre-set requirements to the digital interface. The implement status report may comprise information related to which pre-set requirement is not fulfilled. The local control element may be arranged to refrain from feeding the calculated at least one state parameter to the digital interface when the pre-set requirements are not fulfilled.

The local control element 708 further comprises a monitoring element 791. The monitoring element 791 is arranged to form a sixth state parameter related to the operational status of the implement. The sixth state parameter may be an operational status report. The operational status of the implement may be an adaptive service reminder. The monitoring element may be arranged to monitor the signals obtained by the sensors 717, 727 and to form the sixth state parameter based on the monitoring of the signals obtained by the sensors. For example, the monitoring element may be arranged to form the sixth state parameter when at least one of the sensor signals has exceeded a predetermined value for a predetermined amount of time.

Alternatively or in addition thereto, the local control element may be arranged to receive work vehicle related signals or messages for example by means of the digital interface 701. The monitoring element 791 may then be is arranged to form the sixth state parameter related to the operational status of the implement based on the received working related signals or messages. The work vehicle related signals or messages may comprise
  information on time to next work vehicle service and/or
  information related to operational time of the work vehicle and/or components therein and/or
  information on work vehicle ground speed/velocity and/or
  information on engine speed/velocity For example, the digital interface may comprise a contactless probe for connection to a digital data bus of the work vehicle. The contactless probe may be arranged to monitor the traffic on the digital data bus and to recover said work vehicle related signals or messages.

Alternatively or in addition thereto, the work vehicle related signals received over the digital interface may be directed to the digital interface from a gateway of the work vehicle. The gateway may for example be implemented at a vehicle control element, wherein the vehicle control element characteristically is a distributed system of control nodes arranged to communicate with each other by means of a digital data bus.

The monitoring element 791 is arranged to feed the sixth state parameter related to the operational status of the implement to the digital interface 701. The digital interface 701 arranged to feed the sixth state parameter to the work vehicle, for example to an operator interface of the work vehicle.

Below follows some detailed examples of monitoring.

In one example, the monitoring element 791 is arranged to monitor rotation of the implement in relation to the work vehicle based on the obtained signal related to the position of the implement in relation to the work vehicle. The monitoring element may be arranged to form a sixth state parameter in the form of an operational status report based on the monitoring of the rotation of the implement in relation to the work vehicle.

In one example, the monitoring element 791 is arranged monitor movement of the tool in relation to the implement based on the signal related to the position of the working tool in relation to the implement. The monitoring element may be arranged to form a sixth state parameter in the form of an operational status report based on the monitoring of the movement of the implement in relation to the work vehicle.

In one example, the monitoring element 791 is arranged monitor pressures of the hydraulic circuits and/or hydraulic cylinder arrangements. The monitoring element may be arranged to form a sixth state parameter in the form of an operational status report based on the monitoring of the hydraulic pressures.

The monitoring element 791 may be arranged to monitor how long time the implement is rotated and/or the tool is moved, and to obtain the operational status report based on the determined time(s). In other or complementing examples, the monitoring element is arranged to monitor speed of the rotation of the implement and/or speed of the movement of the tool, and to obtain the implement status report based on the determined speed.

The monitoring element 791 may further instead or in addition thereto be arranged to monitor when the implement is rotated within a predetermined distance from an end position of the implement and/or when the tool is moved within a predetermined distance from an end position of the tool, and to obtain the operational status report based on how long the implement is rotated within the predetermined distance from the end position of the implement and/or how long the tool is moved within the predetermined operator distance from the end position of the tool.

The monitoring element 791 may further be arranged to monitor how long time the hydraulic pressures have exceeded predetermined limits, and to obtain the operational status report based on the determined time(s). In other or complementing examples, the monitoring element is arranged to monitor changes in hydraulic pressures and to obtain the implement status report based on the determined changes in the hydraulic pressures.

The monitoring element 791 is arranged to feed the operational status report to the digital interface. The operational status report may comprise information related to the cause of the operational status report. For example, the operational status report may be in the form of a maintenance reminder. The maintenance would involve for example lubrication of the respective pivoting arrangement. The maintenance could also involve replacing some components subjected to wear. The maintenance reminder comprises for example information that a particular pivoting arrangement of the implement needs lubrication. The maintenance reminder comprises for example information that it is time to replace a particular component of the implement.

For example, a maintenance reminder may be provided when it has been determined that one of the pivoting arrangements at the implement (such as connection between work vehicle and implement and/or connection between implement and working tool) have been operating for a maximum time before maintenance. The operational time is determined based on the movements as determined by the obtained sensor signals. Thus, the operational time only includes time when the pivoting arrangements are actually moving and/or possibly when they are in a loaded state. Further, the speed of the movements and/or pressure changes may also be a parameter which the wear depends on. Accordingly, the speed of the movements and/or pressure changes may also be taken into account when determining when maintenance is needed. Further, the positions of the pivoting arrangement(s) in relation to their end positions and/or the pressures in relation to a maximum pressure may also be a parameter which wear depends on. Accordingly, the time the pivoting arrangement(s) are close to at least one of the end positions of the pivoting arrangement(s) and how close to the end position the pivoting arrangement has been may also be taken into account when determining when maintenance is needed. Further, maintenance or service needs may also be based on pressures in relation to a maximum pressure.

In addition or instead, the monitoring element can be arranged to monitor attachment of the implement to the work vehicle and to obtain the implement status report based on a determined calendar time the implement has been attached to the work vehicle. In addition or instead, the monitoring element can be arranged to monitor a run time for the implement and to obtain the implement status report based on the run time. The operational status report comprises in one example a service reminder comprising information related to a reminder to tighten screws/bolts etc. The service reminder may be provided when the implement has been attached to the work vehicle a time exceeding a predetermined time and/or when the run time for the implement exceeds a predetermined value, or a combination thereof.

For instance, as the monitoring element may be arranged to monitor messages or signals obtained from the work vehicle, the operational status report may be based on and/comprising information related to for example next work vehicle service and/or information related to operational time of the work vehicle and/or components therein.

As stated above, the local control element is arranged to feed the operational status report to the digital interface. The operational status report may comprise information related to the cause of the implement status report. The operational status report may also comprise information related to actions required for remedying the cause of the implement status report. For example, the implement status report may be in the form of the service reminder.

The local control element 708 may further comprise a valve control element 794. The valve control element 794 of the local control element 308 is arranged to receive an operator control signal via the digital interface 701 for operator control of at least one first hydraulic function. The valve control element 794 is arranged to determine a control signal adapted to control at least one control valve based on said operator control signal, and to transmit said control signal to the at least one control valve. Below examples of designs of the valve control element are described in relation to FIG. 11.

In the illustrated example, the local control element 708 comprises further a task planning element 1295. The task planning element is arranged to identifying which state parameters to be calculated and when based on operator input from an operator interface. The task planning element may further be arranged to request valve control in accordance with the operator input. The operator input is received in the form of an operator control signal via the work vehicle digital interface. The operator control signal may comprise a request for at least one state parameter and/or valve control. The task planning element is arranged to handle this request and obtain the requested state parameter(s) and/or valve control. The obtained state parameters are then fed via the digital interface to the operator display. The operator input may comprise task selection. The task selection may comprise a selection of for example position determination, pressure determination, load weight determination, valve control, calibration etc. Thus, each task is at least partly related to one or more state parameters and/or valve control. Further, the operator input may comprise additional operator input related to the specific task.

The task planning element 1295 is arranged to feed the request to those calculating elements, such as the position determining element 790, the load weight determining element 793, the pressure determining element 799 etc., arranged to calculate state parameters associated with the specific task. The task planner may further be arranged to feed the request to the valve control element. The task planning element 1295 may be arranged to continuously request updated calculations of the state parameter from the calculating elements. The updating frequency may be set based on the requirements and/or dynamics of the specific task. The updating frequency may further be set based on available processor capacity and/or bandwidth for transmission. The task planning element may be arranged to combine state parameters from a plurality of state calculating elements and to feed the combined state parameters to the digital interface. The digital interface then transmits the state parameter or combined state parameters to a display of the work vehicle.

The local control element 708 may further comprise a calibration element 792. Examples of functionality of the calibration element 792 are discussed below.

FIG. 5 illustrate schematically examples of display presentations of state parameters transmitted from a local control element arranged at an implement, to said display. The state parameters are characteristically transmitted via the digital interface and presented at the display. Different examples of displays include displays with a touch screen or displays with or connected to a key board. The display may be a mobile device with a display such as a PDA (Personal Digital Assistant).

Figure 5A:
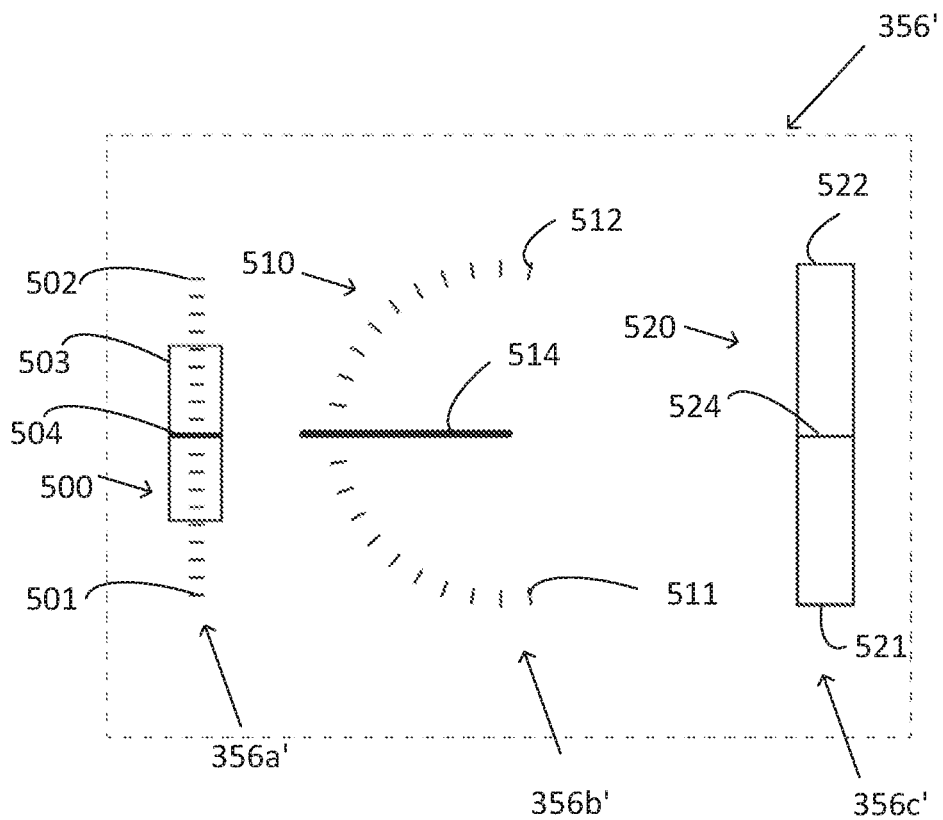
FIGS. 5a-5b illustrate first examples of a display presentation.

FIG. 5*a* discloses an example of a combined display presentation 356' of state parameters. In the illustrated example, three different state parameters are illustrated. However, fewer or more state parameters may be presented on the display presentation.

In the illustrated example, a left display presentation part 356*a*' presents a second state parameter in the form of a position of the implement in relation to the work vehicle. In other words, this left display presentation part 356*a*' presents a lifting height of the implement.

In the illustrated example, the lift height is presented as a mark 504 on column 500. Any other type of diagram one dimensional diagram can be used for marking the height of the implement. In this particular example, a bottom 501 of the column 500 represents that the implement is positioned at its ground position. A top 502 on the staple represents that the implement is raised to its maximum lift position. Thus, the bottom 501 represents zero lift and the top 502 represents 100% lift.

In the illustrated example, a mark 503 indicates an interval along the extension of the column. This interval mark 503 may for example be arranged to representing a suitable working interval for operating the implement. The suitable interval may be a fix interval. The fix interval may be settable by the operator. The suitable interval may be set by the local control element. The interval may for example be selected based on characteristics of the implement, such as maximum lift height, center of gravity of the work vehicle with the implement etc. The suitable interval may be dynamically determined. For example it may be determined based on ground speed of the work vehicle, load weight, etc. Instead or in addition thereto, one or a plurality of individual marks can be presented, wherein the marks represent desired positions. The marks can be manually set for example by means of the operator interface.

Further, in the illustrated example, center display presentation part 356*b*' presents a first state parameter in the form of a tilt position of the working tool in relation to the implement. In the illustrated example, the tilt position is marked by way of a mark 514 on a diagram 510. The diagram 510 has the shape of a periphery of a circle sector. Any other type of one dimensional diagram can be used for marking the tilt angle or tilt position of the working tool in relation to the implement.

The angular extension of the circle sector may coincide with the tilt range of the work vehicle. In the illustrated diagram, the available tilt range extends between an upper 512 endpoint and a lower 511 endpoint for rotation of the work vehicle. The upper 512 endpoint represents a 100% tilt angle and the lower endpoint 511 represents zero tilt angle. The mark 514 is in the illustrated example formed as a pointer from a center of the circle sector extending to the periphery.

Figure 5B:
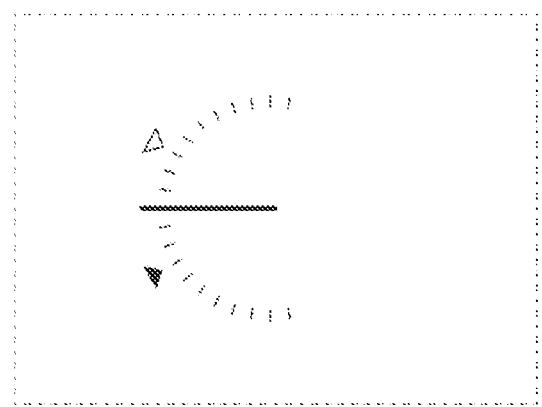

A mark (not shown) may be provided, which indicates an interval along the extension of the periphery. This interval mark may for example be arranged to representing a suitable working interval for tilting of the working tool. The suitable interval may be a fix interval. The fix interval may be settable by the operator. The suitable interval may be set by the local control element. The interval may for example be selected based on characteristics of the implement and/or the working tool. The suitable interval may be a set interval or dynamically determined. For example it may be determined based on ground speed of the work vehicle, load weight, lift height etc. Instead or in addition thereto, one or a plurality of individual marks can be presented, wherein the marks represent desired positions. The marks can be manually set for example by means of the operator interface. FIG. 5*b* illustrates schematically an example of a diagram with set-points indicated.

Further, in the illustrated example, right display presentation part 356*c*' presents a hydraulic pressure or a pressure change. In the illustrated example, the hydraulic pressure is marked by way of a mark 524 on a diagram 520. The diagram 520 has the shape of a column. Any other type of one dimensional diagram can be used for illustrating the hydraulic pressure. The pressure is in the illustrated example given as a relative hydraulic pressure. In the illustrated diagram, the column extends between a bottom 521 zero pressure and a top 100% pressure, i.e. the maximum system pressure.

A mark (not shown) may be provided, which indicates an interval along the extension of the column. This interval mark may for example be arranged to representing a suitable working interval for the hydraulic pressure. The suitable interval may be a fix interval. The fix interval may be settable by the operator. The suitable interval may be set by the local control element. The interval may for example be selected based on characteristics of the implement and/or the working tool. The suitable interval may be a set interval or dynamically determined. For example it may be determined based on ground speed of the work vehicle, load weight, lift height etc. Instead or in addition thereto, one or a plurality of individual marks can be presented, wherein the marks represent desired hydraulic pressures. The marks can be set manually for example by means of the operator interface.

As stated above, the display presentation may comprise other and fewer or more presentation views. However, this presentation with relative height, relative tilt angle and relative pressure for example in a lift cylinder gives a good decision support for the operator of the work vehicle. The operator gets an overview about how close to the limits the system is operating. The operator can take measures to make sure that the system is operating within limits. For example, if the work vehicle is travelling on a bumpy road, the required pressures may intermittently increase above the maximum levels if not measure as taken such as lowering the implement, emptying load carried by the working tool etc.

Figure 6A:
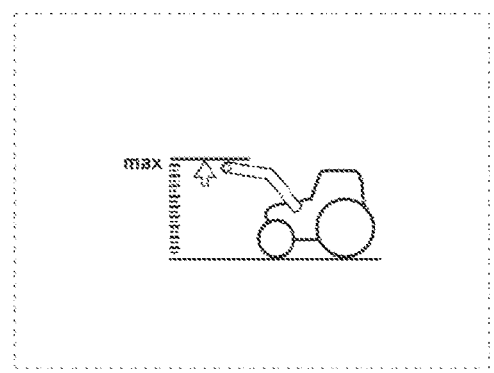
FIGS. 6a-6c illustrate second examples of display presentations.

FIG. 6a illustrates a first step of the guided instruction. This first step comprises presentation of lift of the implement to its highest, maximum position. When the highest, maximum position has been reached, the settings of position sensors related to the implement at the upper maximum position are recorded. The recording is performed either automatically or upon operator request to record the highest, maximum position. This set maximum position can be used in any application for determining the height of the implement. This set maximum position may in particular be used for determining the height of the implement for example during lift for load weight determination.

The guided instruction then moves to a second step.

Figure 6B:
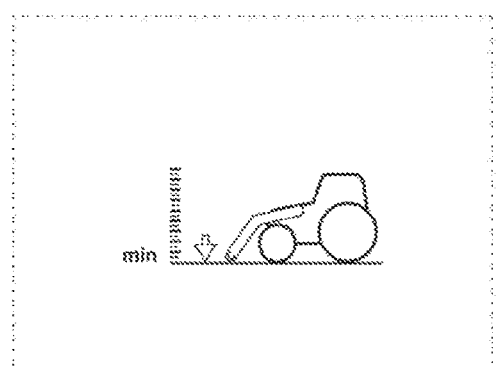

FIG. 6b illustrates a second step of the guided instruction. This second step comprises presentation of lowering the implement to its lowest position. When the lowest, minimum position has been reached, the settings of position sensors related to the implement at this lowest, minimum position are recorded. The recording is performed either automatically or upon operator request to record the lowest, minimum position. This set minimum position may be used in any application for determining the height of the implement. This set minimum position may in particular be used in determining the height of the implement for example during lift for load weight determination.

The recoded maximum and minimum positions are stored as characteristics of the implement. The values can be used in operating any working tool by means of the implement. The values for the maximum and minimum positions define the range of operation of the implement. Any obtained implement lift related sensor signals can then be correlated to these minimum and maximum positions to provide lift height information.

However, in this step, a system maximum pressure related to lift cylinder(s) of the implement is also determined. Accordingly, the operator is required to continue press the implement to the minimum position until the maximum system pressure has been reached. Then the maximum, system pressure is recorded. The recording is performed either automatically of upon operator request to record the maximum pressure.

The recorded maximum hydraulic pressure is stored as a characteristic of the implement. The value can be used in operating any working tool by means of the implement. The values maximum hydraulic pressure defines the range of operation of the implement. Any obtained hydraulic pressure related sensor signals can then be correlated to this maximum hydraulic pressure to provide lift height information.

The steps can be performed in opposite order, wherein the steps illustrated in FIG. 6b is first performed and then the step illustrated in FIG. 6a is performed.

Figure 6C:
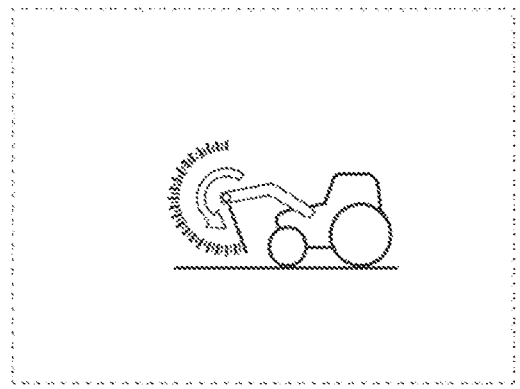

FIG. 6c illustrates yet a step of the guided instruction. This step relates to recording maximum and minimum rotational positions for the working tool in relation to the implement. In the Figure it is illustrated that the operator is requested to operate the working tool to its maximum rotational position. When the maximum rotational position of the working tool has been reached, the settings of position sensors related to the working tool at the maximum rotational position are recorded. The recording is performed either automatically or upon operator request to record the maximum rotational position. This set maximum rotational position can be used in any application for determining the rotational position of the working tool. This set maximum position may in particular be used for determining the rotational position of the working tool for example during lift for load weight determination.

The recording of the minimum rotational positions of the working tool in relation to the implement comprises the following. The operator is requested to operate the working tool to its minimum rotational position. When the minimum rotational position of the working tool has been reached, the settings of position sensors related to the working tool at the minimum rotational position are recorded. The recording is performed either automatically or upon operator request to record the minimum rotational position. This set minimum rotational position can be used in any application for determining the rotational position of the working tool. This set maximum position may in particular be used for determining the rotational position of the working tool for example during lift for load weight determination.

The recoded maximum and minimum rotational positions are stored as characteristics of the implement. The values can be used in operating any working tool by means of the implement. The values for the maximum and minimum rotational positions define the range of operation of the implement. Any obtained rotational position related sensor signals can then be correlated to these minimum and maximum rotational positions to provide rotational position or angle information.

These steps may be performed in opposite order.

FIGS. 12a-12e illustrate schematically operation of the calibration element for assisting in determining settings of the implement along with working tool for accurate load weight determination. The calibration element comprises a guided instruction for recording settings for the implement together with the working tool for use in later calculations by the load weight determining element.

FIGS. 12a-12e illustrate schematically operation of the calibration element for assisting in determining settings of the implement along with working tool for accurate load weight determination. The calibration element comprises a guided instruction for recording settings for the implement together with the working tool for use in later calculations by the load weight determining element.

Figure 12A:
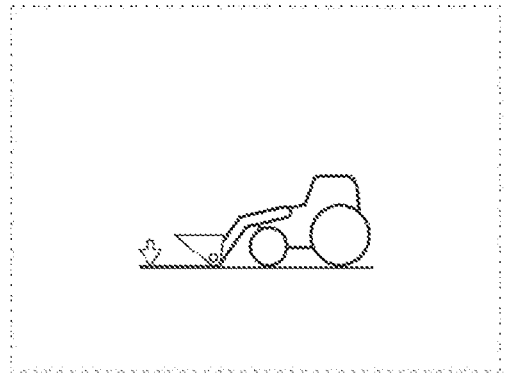
FIGS. 12a-12e disclose third examples of display presentations.

FIG. 12a illustrates a first step of the guided instruction for determining settings for accurate load weight determination. This first step comprises presentation of lowering of the implement to its lowest position, at the ground. When the implement is at its lowest position at the ground, the guided instruction proceeds to a second step. The second step is either entered automatically or upon operator request.

Figure 12B:
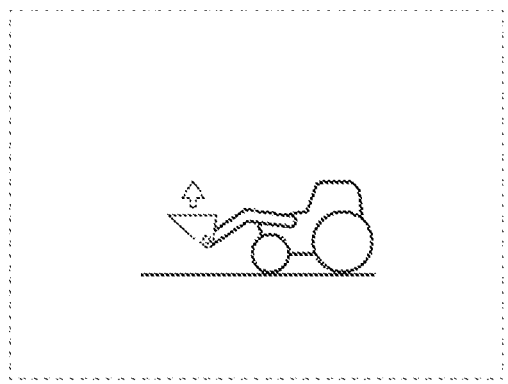

FIG. 12b illustrates the second step of the guided instruction for determining settings for accurate load weight determination. This second step comprises presentation of lifting of the implement towards it highest, maximum position. When the implement has started to lift, the guided instruction proceeds to a third step.

Figure 12C:
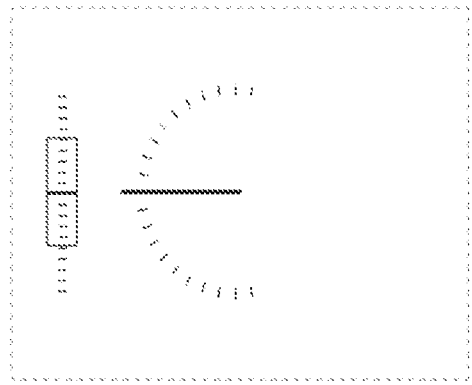

FIG. 12c illustrates the third step of the guided instruction. In the third step, the height of the implement is continuously illustrated in the column of the left diagram. An interval in the middle of the column indicates that measuring for weight determination is performed within this interval. Factors which may be important for accurate load weight determination are lifting speed at least within the measuring interval and/or rotational position of the working tool. In FIG. 12c, lift height is continuously presented during the lift movement. Further, present rotational position is also presented during the lifting movement, as presented in the diagram to the right. In a not illustrated example, a recommended rotational position is presented in the right diagram during the lifting movement.

A first reference pressure curve with pressures given as a function of height of the implement, or the like, is recorded. The rotational position of the working tool in the load weight measuring interval may also be recorded. Further a velocity or speed of the implement while measuring may also be recorded. In one example, the velocity or speed of the implement and/or rotational position of the working tool when measuring is evaluated. If for example the speed of the implement is above a predetermined value, the guidance instruction does not record the measurement. Instead, the operator may be requested to make a new lifting movement from the minimum position (ground). The request may be made together with information related to the cause of the failure. Further, if the rotational position of the working tool is outside present limit(s) the calibration element can be arranged not to record the measurement. As in the previous example, the guiding instruction may be arranged to request the operator to make a new lifting movement from the minimum position. The request may be made together with information related to the cause of the failure.

The lifting movement of FIG. 12c can be made with empty load. Then this first reference curve relates to the load weight of the working tool. Then this weight can be easily eliminated in load weight calculations. If the working tool carries a load, the weight of the load should be input in conjunction with this phase. The load weight may be input by means of the operator interface.

Figure 12D:
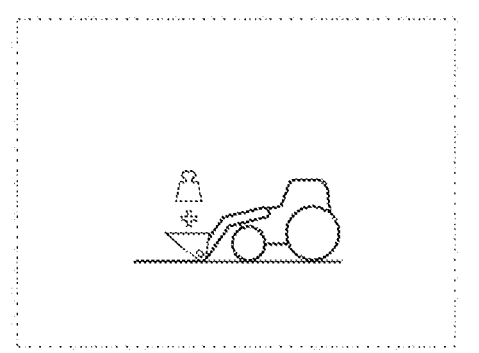
Figure 12E:
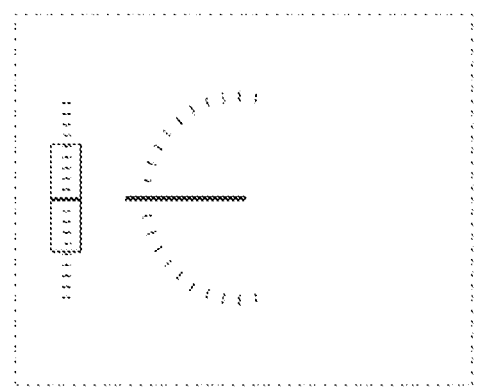

FIG. 12d illustrates the fourth step of the guided instruction for determining settings for accurate load weight determination. This fourth step comprises presentation of lifting of the implement towards it highest, maximum position with a known load. Thus, the operator is requested to redo the lift, with the known load. The weight of the load should be input in conjunction with this phase. The load weight may be input by means of the operator interface. It is important that the first lift of FIGS. 12b, 12c and the second lift of FIGS. 12d, 12e are made with different loads. When the implement has started to lift, the guided instruction proceeds to a fifth step.

FIG. 12d illustrates the fifth step of the guided instruction. This coincides with the third step but performed with a different reference load so as to obtain a second reference curve.

After this sequence of steps has been performed, the implement is ready for load weight determination.

Generally, the local control element of the implement can be arranged to store thereon a calibration set related to each tool which has been calibrated with the implement. The operator can then select from the operator interface which working tool is mounted to the implement and accordingly, the calibration settings associated to that working tool are applied. Alternatively, the implement is arranged to identify which working tool is mounted to the implement based on sensor signal input. Then, the calibration set associated to that working tool can automatically be applied.

Further, each working tool may be associated with a plurality of calibration sets. Each calibration set may be intended for a given orientation of the working tool. The local control element can then be arranged to determine which calibration set is to be applied based on sensor input. Alternatively, the operator of the work vehicle can select which calibration set for the working tool is to be applied.

Alternatively or in addition thereto, if the working tool is provided with a working tool local control element, the working tool local control element can be arranged to store thereon the calibration set(s) associated with that working tool. Alternatively or in addition thereto, the working tool local control element is arranged to determines which tool is attached to the implement and/or determine the orientation of the attached working tool. The working tool local control element may then be arranged to transmit this information to the implement local control element for determination of which calibration set is to be applied.

Figure 8:
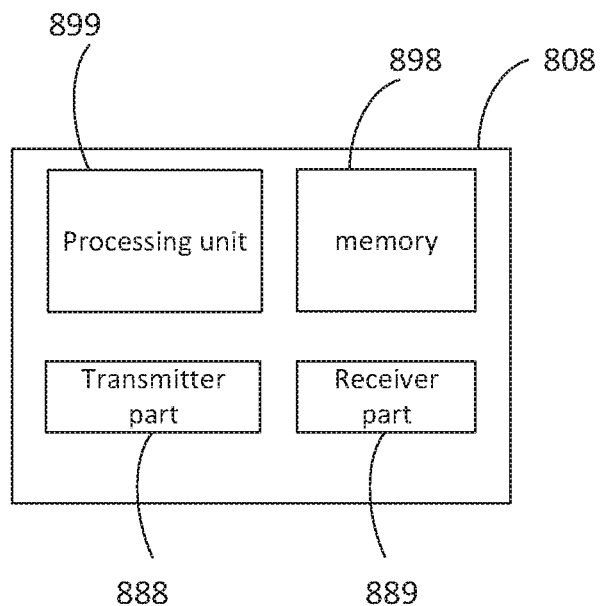
FIG. 8 is a block scheme schematically illustrating an example of a local control element.

FIG. 8 illustrates a local control element 808. The local control element 808 comprises a receiver part 889, a transmitter part 888, a processing unit 899 and memory 898 or memories. Program code for executing the different tasks of the local control element is stored in the memory 898 or memories. Further, the memory can store data related to the implement. Sensor data obtained from the at least one sensor and possible control data from the operator input element can be stored in the memory. Further, processed information related to the obtained sensor data may also be stored on the memory. Thus, intelligence is related to implement, the local control element is not only a gatherer of data.

Accordingly, all data related to the implement is obtained, processed and stored within the implement. Thus, as all data related to the implement is stored in the memory of the implement. This has the consequence that if an implement is moved for example to another work vehicle, all data associated therewith follows the implement. Accurate monitoring of the operation of the implement is enabled. Operational data is obtained by and related to the implement. Switching the implement between work vehicles can be made without disturbing monitoring. Monitoring can be made when the implement is attached to any work vehicle. Communication with the implement can be performed digitally. No analogue signals for example related to sensor data is for example communicated to the work vehicle. For example, the local control element can form a CAN node in a CAN network of the work vehicle. When the local control element is used for control of hydraulics at the work vehicle for control of the implement, the work vehicle does not need to comprise components secured for control of the implement. All such components are present within the implement. Thus, the work vehicle can be produced at a lower cost.

As is clear from the above, the transmitter part 888 and the receiver part 889 of the local control element can be arranged for digital transmission/reception, either wired or wirelessly. For example, the local control element transmitter and received can form a CAN transmitter/receiver connected to CAN of the work vehicle.

The local control element can instead, or in addition thereto, be remotely accessed. The local control element then has or is connected to a wireless communication element. The wireless communication element may be arranged to communicate by means of Bluetooth and/or WiFi and/or radio. The local control element is arranged to feed obtained sensor signals/and or at least one state parameter and/or signals or messages recovered or otherwise obtained from the work vehicle. The wireless communication element may be arranged to feed data to a data storage and processing system. The wireless communication element may be arranged to feed data to a mobile application having access to the data storage and processing system.

Thus, the data stored by the implement can instead or in addition thereto be communicated to a remote location. The data can be transmitted to a remote data storage system. The remote data storage and processing system may be arranged to store data related to a plurality of implements. The remote data storage system may comprise one or a plurality of databases. Further, the data can be communicated to a mobile application. The data may be communicated to the remote data storage system via the mobile application. In one example, the implement communicates with the mobile application over Bluetooth. The mobile application or the remote storage system may provide information to different applications such as a web application, for example of the implement owner or implement user or a customer support or an administration centre.

When the working tool has a local working tool control element, for example as discussed in relation to FIG. 4, the local working tool control element can be designed in the same manner.

Figure 11:
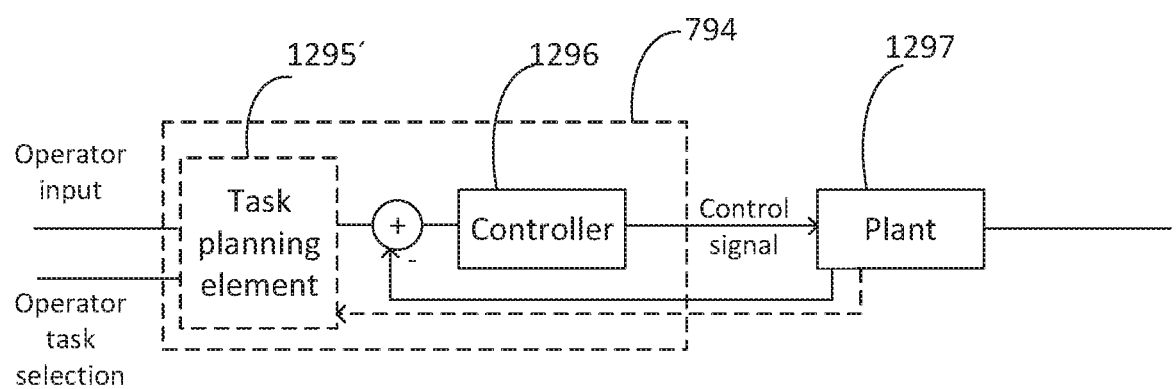
FIG. 11 is a scheme schematically illustrating the operation of a valve control element of a local control element.

In FIG. 11, an example of a valve control element of a local control element is disclosed. The valve control element receives an operator input signal received from an operator control element. The operator control signal may be a signal from a joystick or from a display with input means or from physical input buttons.

In different examples, wherein the control valve is substantially directly controlled by the joystick or input means of the display, movement of for example the joystick along one line (such as left/right) may indicate selection of a hydraulic function associated to that movement while movement of for example the joystick along a different line (such as up/down), may indicate selection of another function associated to that movement. Further when controlling the hydraulic function controlled by the selected movement, movement of the joystick in one direction (such as left) would form a selection of hydraulic flow in one direction and movement of the joystick in the other (such as right) would form a selection of hydraulic flow in the other direction. Further, the position of the joystick in relation to a zero position may form a selection of the size of the hydraulic flow.

Different tasks of the implement may be pre-programmed to a task planning element 1295'. Tasks are selected by means of an operator task selector signal. Characteristically the operator task selection signal is obtained via the input means of the display. However, different tasks can also be selected using the joystick or physical buttons in a console. The task planning element is arranged to form a processed output based on the operator input signal and the operator task selection signal.

The operator input signal and/or an output from the task planning element 1295' forms as a set value to a closed loop. The closed loop comprises a controller 1296. The controller may be any type of regulator such as a P regulator, PI-regulator or a PID regulator. The signal output by the controller forms the control signal for the control valve(s) of the work vehicle. Further, a signal representing an actual value is fed back. Further available states of the plant 1297, i.e. control valves, implement and possibly work vehicle, are fed to the task planner for processing. The states may include obtained sensor signals. The states may include other type of information such as information related to the states of valves, the work vehicle etc.

Accordingly, the valve control element continuously obtains control signals for the control of the work vehicle control valves.

The task planning element 1295' may for part of the task planning element as exemplified in relation to FIG. 7.

Figure 9:
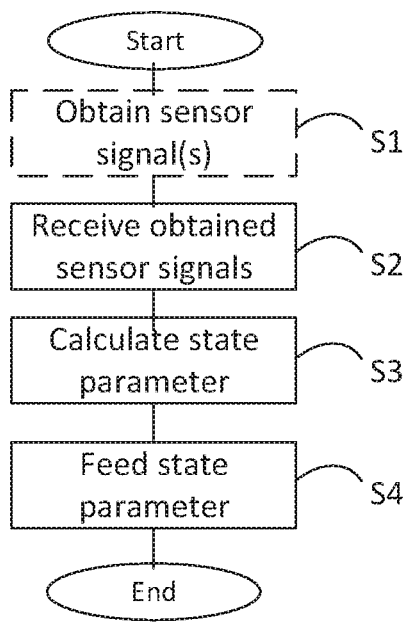
FIG. 9 is a flow chart illustrating an example of a method for obtaining information related to an implement.

In FIG. 9, a method for obtaining information related to an implement is illustrated. The method is performed at said implement connectable to a work vehicle. The implement have some of the features of the implement as disclosed in the detailed description. The implement comprises at least one first sensor, a digital interface to the work vehicle and a local control element connected to the interface.

The method comprises the steps of receiving (S2) at the local control element obtained sensor signals. The method further comprises a step of calculating (S3) at the control element a state parameter related to the implement based on the obtained sensor signals. The method comprises yet further a step of feeding (S4) the calculated state parameter to the digital interface.

The examples as disclosed herein present examples of calculations of state parameters using exemplified sensor types. However any type of state parameters can be calculated in dependence of the sensors used. For example the sensors may be mounted to the implement and/or working tool attached thereto including but not limited to at least one accelerometer and/or at least one GPS receiver or the like and/or at least one volt meter and/or at least one strain gauge or other force sensing sensor.

We claim:

1. An implement connectable to a work vehicle, said implement comprising
   an arm;
   a fastening arrangement arranged at a first part of the arm, said fastening arrangement being connectable to the work vehicle;
   an attaching arrangement connected to a second part of the arm, said attaching arrangement being attachable to a tool;
   a first implement hydraulic connection connectable to the work vehicle by means of a corresponding first vehicle hydraulic connection,
   at least one first sensor arranged to obtain sensor signals at least related to at least one first hydraulic function,
   a digital interface, upon connection of the implement to the work vehicle, configured to provide digital communication between the implement and the work vehicle, and
   a local control element arranged to receive the obtained sensor signals, to calculate at least one state parameter related to the implement based on the obtained sensor signals and to feed the calculated state parameter to the digital interface;
   wherein:
   when the first implement hydraulic connection is connected to the corresponding first vehicle hydraulic connection, a first hydraulic circuit controlled by means of the work vehicle mounted control valve is configured to carry hydraulic fluid to at least one first hydraulic function; and
the digital interface is arranged to transmit the received state parameter to the work vehicle.

2. The implement according to claim 1, wherein the at least one first hydraulic function comprises a movement of a tool in relation to the implement and wherein the at least one first sensor comprises a sensor arranged to obtain signals relating to a rotational position of the tool in relation to the implement.

3. The implement according to claim 2, wherein the at least one state parameter comprises a first state parameter related to the position of a working tool, velocity of a working tool, acceleration of a working tool, or a combination thereof, in relating to the implement, and
wherein the first state parameter comprises a relative position of the working tool in relation to the implement and
wherein the local control element is arranged to calculate the relative position based on the obtained sensor signal relating to the rotational position of the tool in relation to the implement and based on a maximum rotational position of the tool in relation to the implement.

4. The implement according to claim 3, further comprising a digital working tool interface for communication with a working tool sensor, a local working tool control element at the working tool, or both, wherein the digital working tool interface is connected to the local control element.

5. The implement according to claim 1, further comprising
a second hydraulic circuit configured to carry hydraulic fluid to at least one second hydraulic function; and
at least one second sensor arranged to obtain sensor signals at least related to the at least one second function,
wherein the at least one second hydraulic function comprises a movement of the implement in relation to the work vehicle, and
wherein the at least one second sensor comprises a sensor arranged to obtain signals relating to a rotational position of the implement in relation to the work vehicle.

6. The implement according to claim 5, wherein the at least one state parameter comprises:
a second parameter relating to a position of the implement, velocity of the implement, acceleration of the implement, or a combination thereof, in relation to the work vehicle and,
a relative position of the implement in relation to the work vehicle, and wherein the local control element is arranged to calculate said relative position based on the obtained signal relating to the rotational position of the implement in relation to the work vehicle and based on a maximum rotational position of the implement in relation to the work vehicle.

7. The implement according to claim 5, wherein the at least one state parameter comprises a third parameter related to the position of the working tool, velocity of the working tool, acceleration of the working tool, or a combination thereof, in relation to the work vehicle, and
wherein the local control element is arranged to calculate the position of the working tool, velocity of the working tool, acceleration of the working tool, or a combination thereof, in relation to the work vehicle based on the obtained signals from the first and second sensors.

8. The implement according to claim 1, wherein the at least one first sensor, an at least one second sensor, or both comprise at least one pressure sensor arranged to obtain a signal related to a hydraulic pressure related to the implement, a working tool attached thereto, or both, wherein the at least one state parameter comprises a fourth state parameter related to a hydraulic pressure, a pressure change, or both.

9. The implement according to claim 8, further comprising:
a first hydraulic cylinder arrangement connected to the first implement hydraulic connection for control of the at least one first hydraulic function;
a second hydraulic cylinder arrangement connected to a second implement hydraulic connection for control of the at least one second hydraulic function, or both;
wherein the least one pressure sensor is arranged to obtain a signal related to at least one pressure related to the first cylinder arrangement, the second cylinder arrangement, or both.

10. The implement according to claim 1, wherein the local control element is arranged to determine whether the calculated state parameter fulfils at least one pre-set requirement and when the at least one pre-set requirement is not fulfilled, obtain an implement status report informing that the calculation of the state parameter does not fulfil the pre-set requirement and to feed the obtained implement status report to the digital interface.

11. The implement according to claim 1, wherein the local control element is arranged
to receive work vehicle related signals or messages via the digital interface, and
wherein the digital interface comprises a contactless probe for connection to a digital data bus of the work vehicle, the contactless probe being arranged to monitor traffic on the digital data bus and to recover said work vehicle related signals or messages.

12. The implement according to claim 11, wherein the work vehicle related signals or messages comprises:
information on time to next work vehicle service,
information related to operational time of the work vehicle, components therein, or both;
information on work vehicle ground speed, velocity, or both;
information on work vehicle engine speed, velocity, or both; or
a combination thereof.

13. The implement according to claim 1, wherein the local control element is arranged to receive an operator control signal via the digital interface, wherein the operator control signal comprises a request for at least one state parameter and wherein the local control element is arranged to obtain the state parameter and feed the state parameter to the digital interface.

14. The implement according to claim 13, wherein the operator control signal comprises information identifying a task to be performed and wherein the local control element comprises a task planning element arranged to request at least one state parameter in accordance with a set of rules associated to the task to be performed and to feed the at least one state parameter obtained in response to the request to the digital interface.

15. The implement according to claim 1, wherein the local control element is arranged to receive a sensor signal from a sensor arranged at a working tool attached to the implement, wherein said local control element is arranged to calculate the at least one state parameter based on an obtained working tool sensor signal.

16. A work vehicle arrangement comprising:
a work vehicle, and
an implement according to claim 1 attached to said work vehicle.

17. The work vehicle arrangement according to claim 16, further comprising an operator interface comprising a display arranged to display the at least one state parameter.

18. A method for obtaining information related to an implement as defined in claim 1, comprising the steps of:
receiving, at the local control element, obtained sensor signals;
calculating, at the local control element, a state parameter related to the implement based on the obtained sensor signals; and
feeding the calculated state parameter to the digital interface.

* * * * *